US008863356B2

(12) United States Patent
Bacchetti

(10) Patent No.: US 8,863,356 B2
(45) Date of Patent: Oct. 21, 2014

(54) PISTON DEVICE FOR THE CONTROLLED ROTATABLE MOVEMENT OF DOORS, SHUTTERS OR LIKE MEMBERS

(75) Inventor: Luciano Bacchetti, Nave (IT)

(73) Assignee: In & Tec S.R.L., Brescia (IT)

( * ) Notice: Subject to any disclaimer, the term of this patent is extended or adjusted under 35 U.S.C. 154(b) by 0 days.

(21) Appl. No.: 14/115,868

(22) PCT Filed: May 18, 2012

(86) PCT No.: PCT/IB2012/052504
§ 371 (c)(1),
(2), (4) Date: Nov. 7, 2013

(87) PCT Pub. No.: WO2012/156949
PCT Pub. Date: Nov. 22, 2012

(65) Prior Publication Data
US 2014/0075718 A1   Mar. 20, 2014

(30) Foreign Application Priority Data

May 19, 2011  (IT) .............................. VI2011A0124

(51) Int. Cl.
*E05F 3/20* (2006.01)
*E05F 3/10* (2006.01)
*F16F 9/18* (2006.01)
*E05D 11/10* (2006.01)

(52) U.S. Cl.
CPC ............ *E05F 3/10* (2013.01); *E05Y 2201/458* (2013.01); *E05D 11/1064* (2013.01); *E05Y 2900/132* (2013.01); *E05F 3/104* (2013.01); *E05Y 2201/234* (2013.01); *E05D 2011/1092* (2013.01); *E05Y 2600/46* (2013.01); *E05Y 2201/20* (2013.01); *F16F 9/18* (2013.01); *E05F 3/20* (2013.01)

USPC .................................................. 16/54; 16/252

(58) Field of Classification Search
USPC ........... 16/54, 55, 50, 68, 281, 284, 286, 252, 16/253
See application file for complete search history.

(56) References Cited

U.S. PATENT DOCUMENTS

| 2,588,010 | A    |   | 3/1952  | Kennon    |        |
|-----------|------|---|---------|-----------|--------|
| 6,560,821 | B2   | * | 5/2003  | Miller et al. | 16/252 |
| 6,704,966 | B1   | * | 3/2004  | Kao       | 16/252 |
| 7,305,796 | B2   | * | 12/2007 | Chiang    | 16/252 |
| 7,552,509 | B2   | * | 6/2009  | Chen et al. | 16/50  |
| 7,900,319 | B2   | * | 3/2011  | Bacchetti | 16/252 |
| 8,191,206 | B1   | * | 6/2012  | Bacchetti | 16/53  |
| 8,572,807 | B2   | * | 11/2013 | Walhorn et al. | 16/252 |

(Continued)

FOREIGN PATENT DOCUMENTS

| EP | 1703166    | 9/2006 |
|----|------------|--------|
| WO | 2011009557 | 1/2011 |

*Primary Examiner* — Jeffrey O Brien
(74) *Attorney, Agent, or Firm* — Themis Law

(57) ABSTRACT

A piston device for the controlled rotatable movement of a closing element anchored to a stationary support structure includes a tubular body removably insertable into at least one seat of a hinge device, an actuating head external to the tubular body, a plunger member slidably movable unitarily with the actuating head between a retracted end position and an extended end position, an elastic contrast member acting on the plunger member for the returning thereof from the retracted end position to the extended end position, and a working fluid acting on the plunger member to hydraulically counteract the action thereof. A hinge device, in which a piston device according to the invention is removably insertable.

19 Claims, 19 Drawing Sheets

(56) References Cited

U.S. PATENT DOCUMENTS

| | | |
|---|---|---|
| 2010/0024159 A1 | 2/2010 | Oh et al. |
| 2010/0199459 A1* | 8/2010 | Bacchetti ............... 16/54 |
| 2011/0219583 A1* | 9/2011 | Bacchetti ............... 16/54 |
| 2011/0283478 A1* | 11/2011 | Berry et al. ............ 16/54 |

* cited by examiner

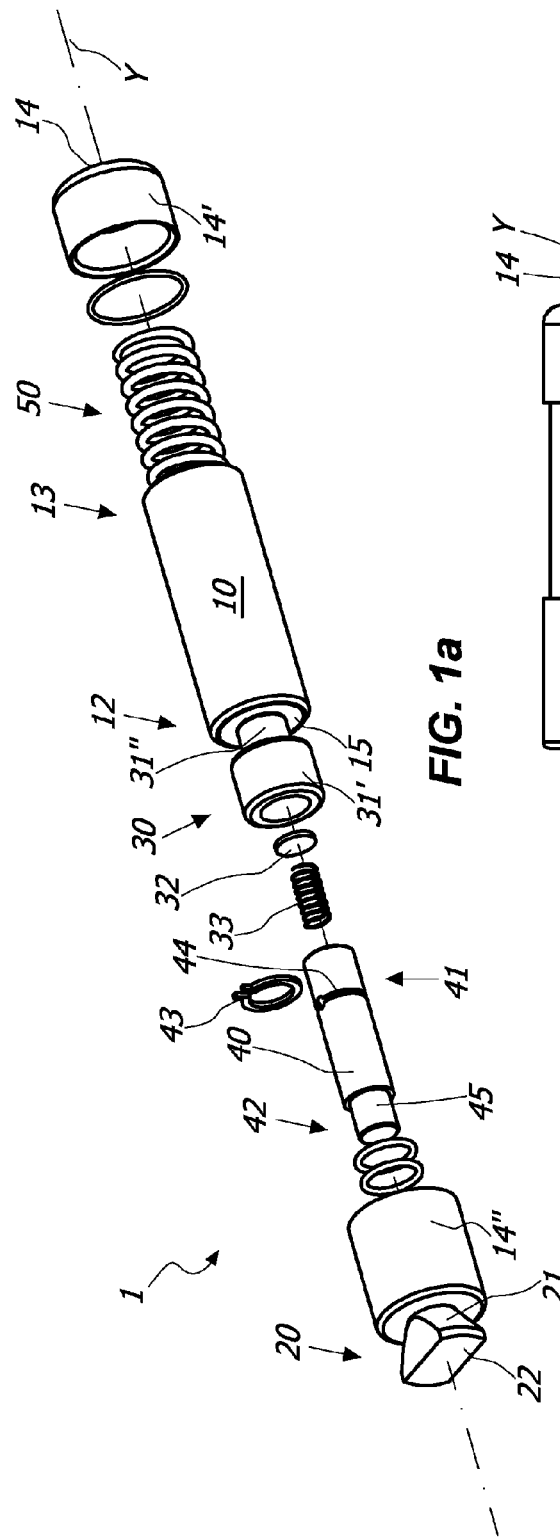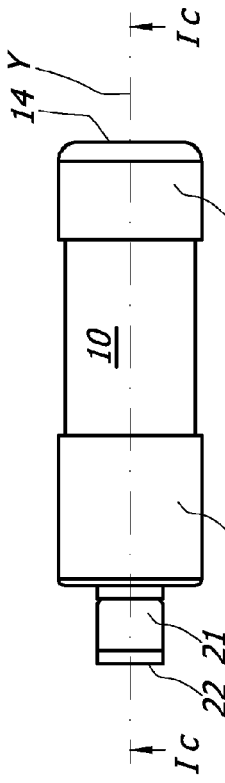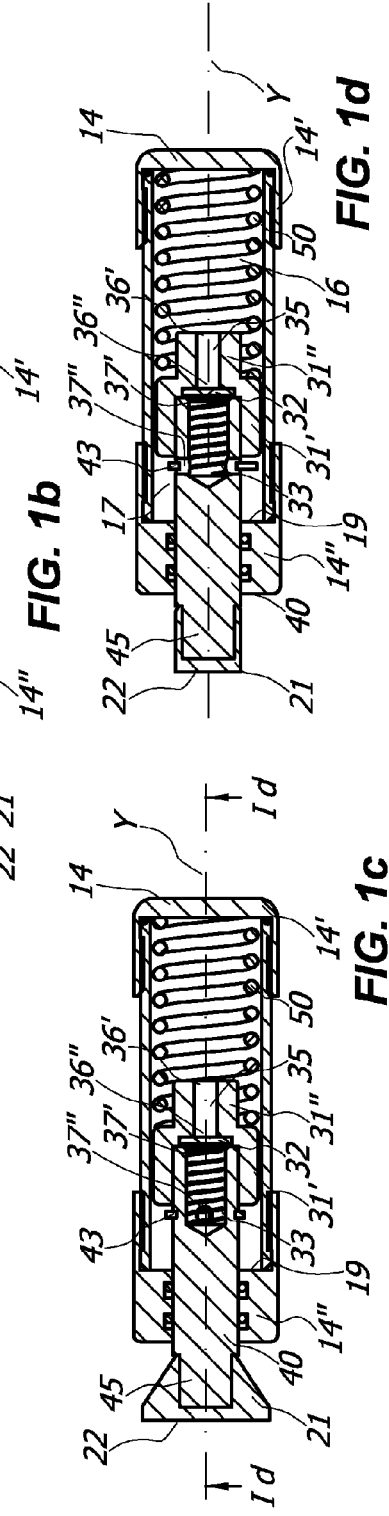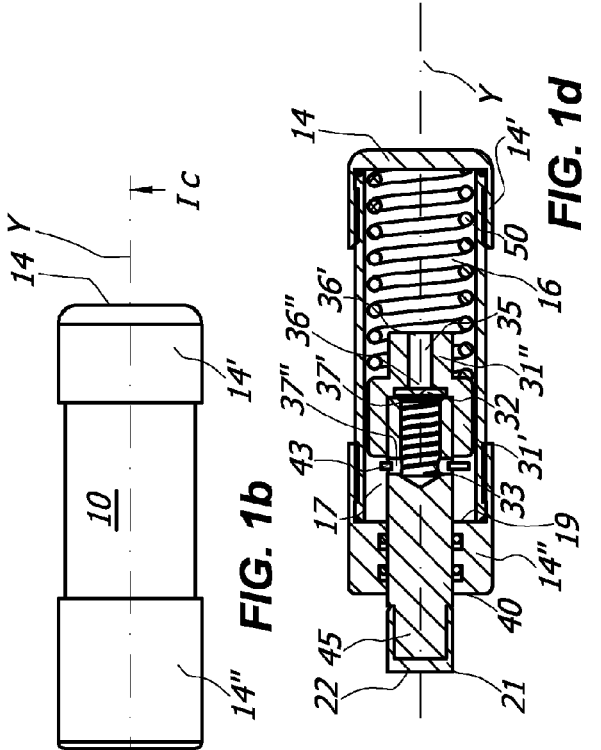

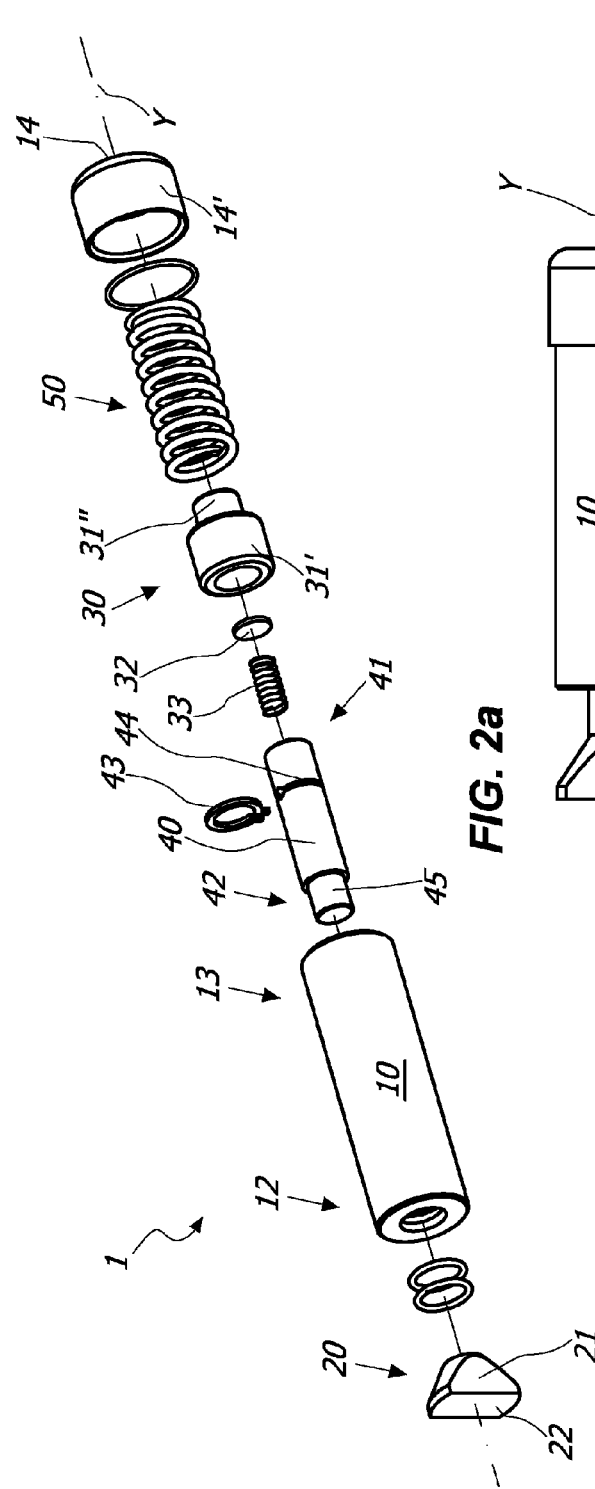

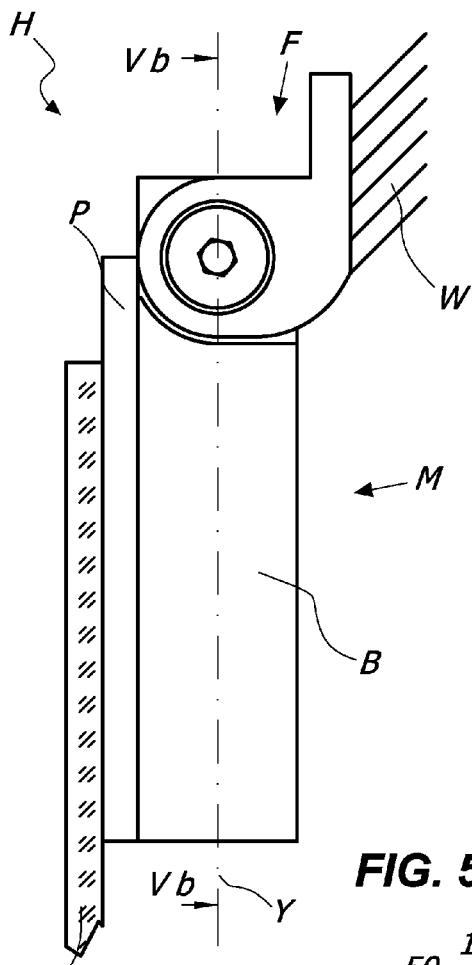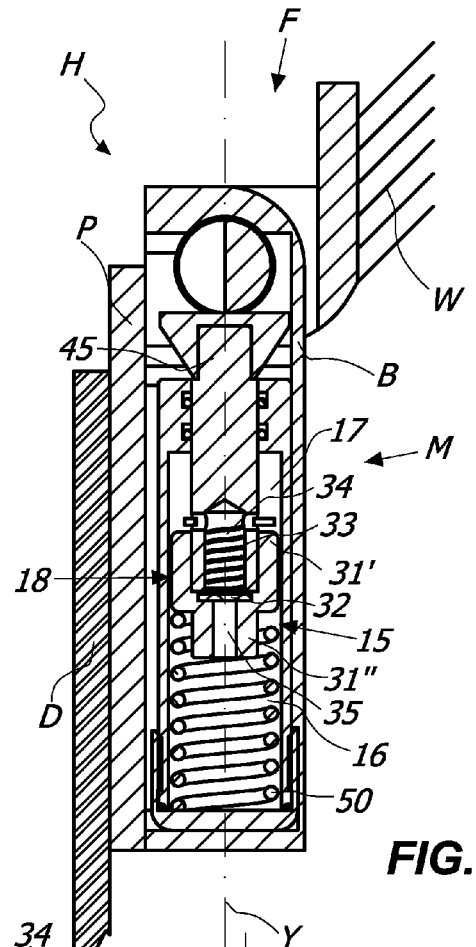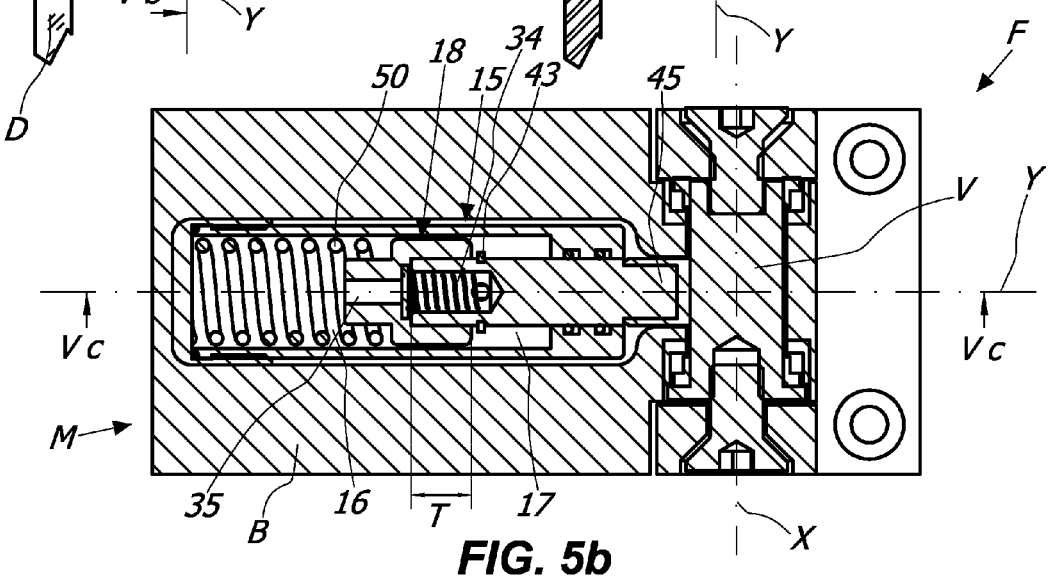
FIG. 5a
FIG. 5c
FIG. 5b

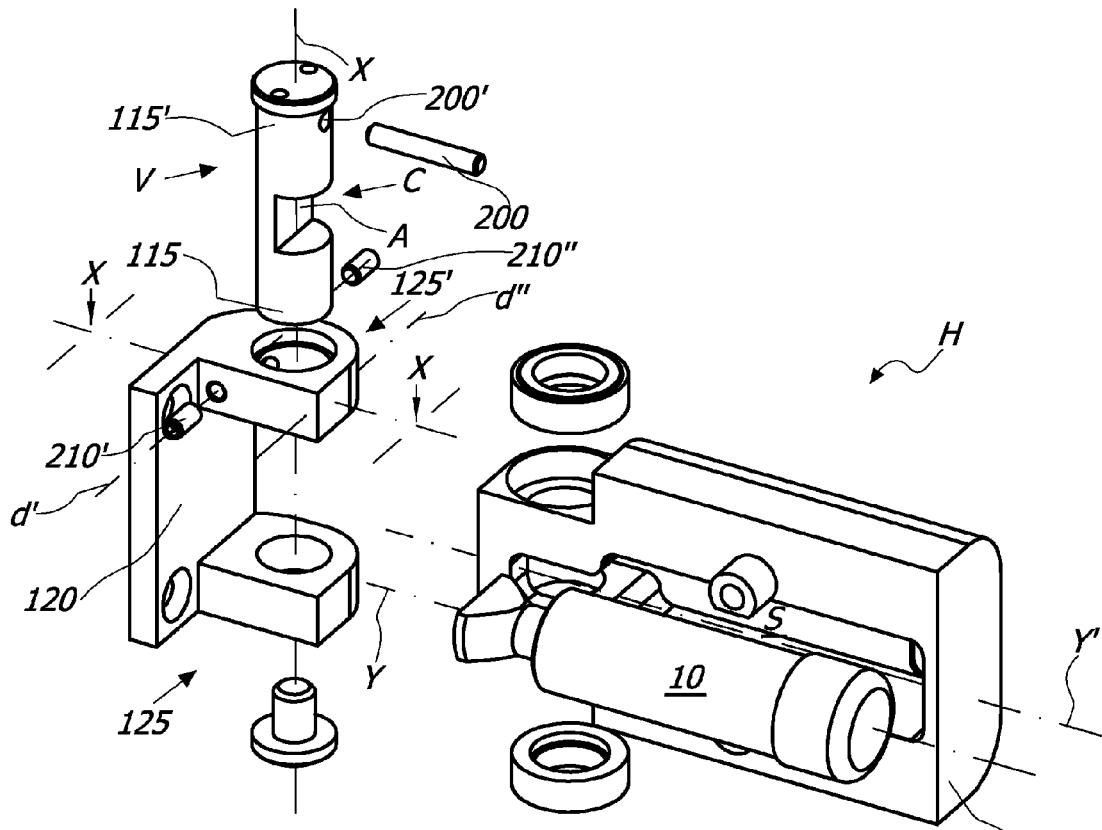
FIG. 10a
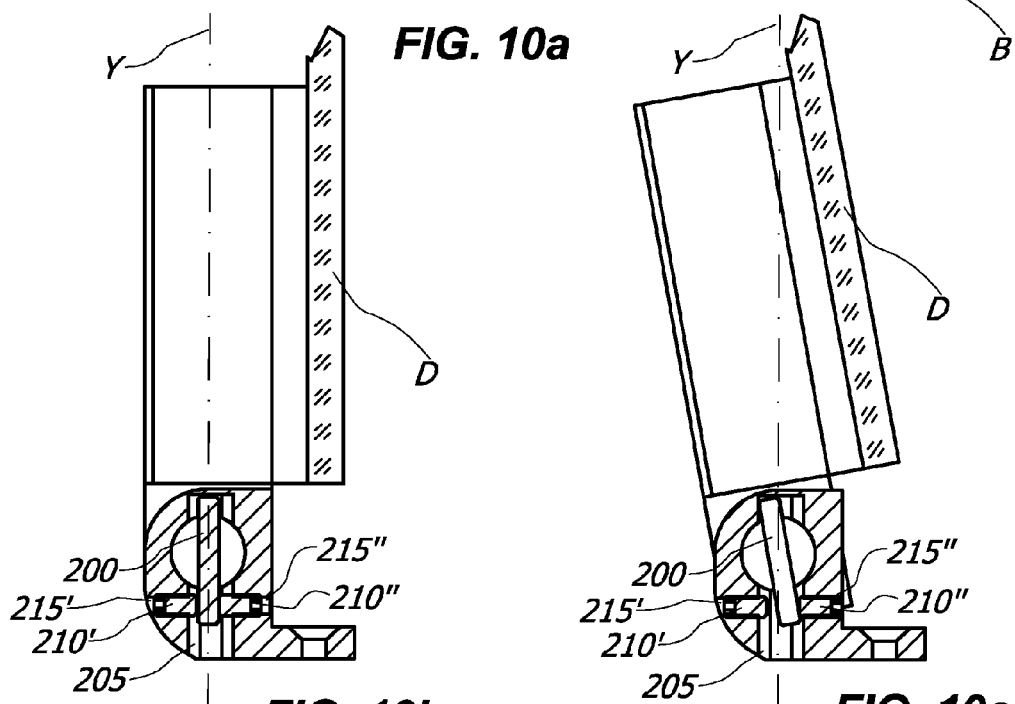
FIG. 10b  FIG. 10c

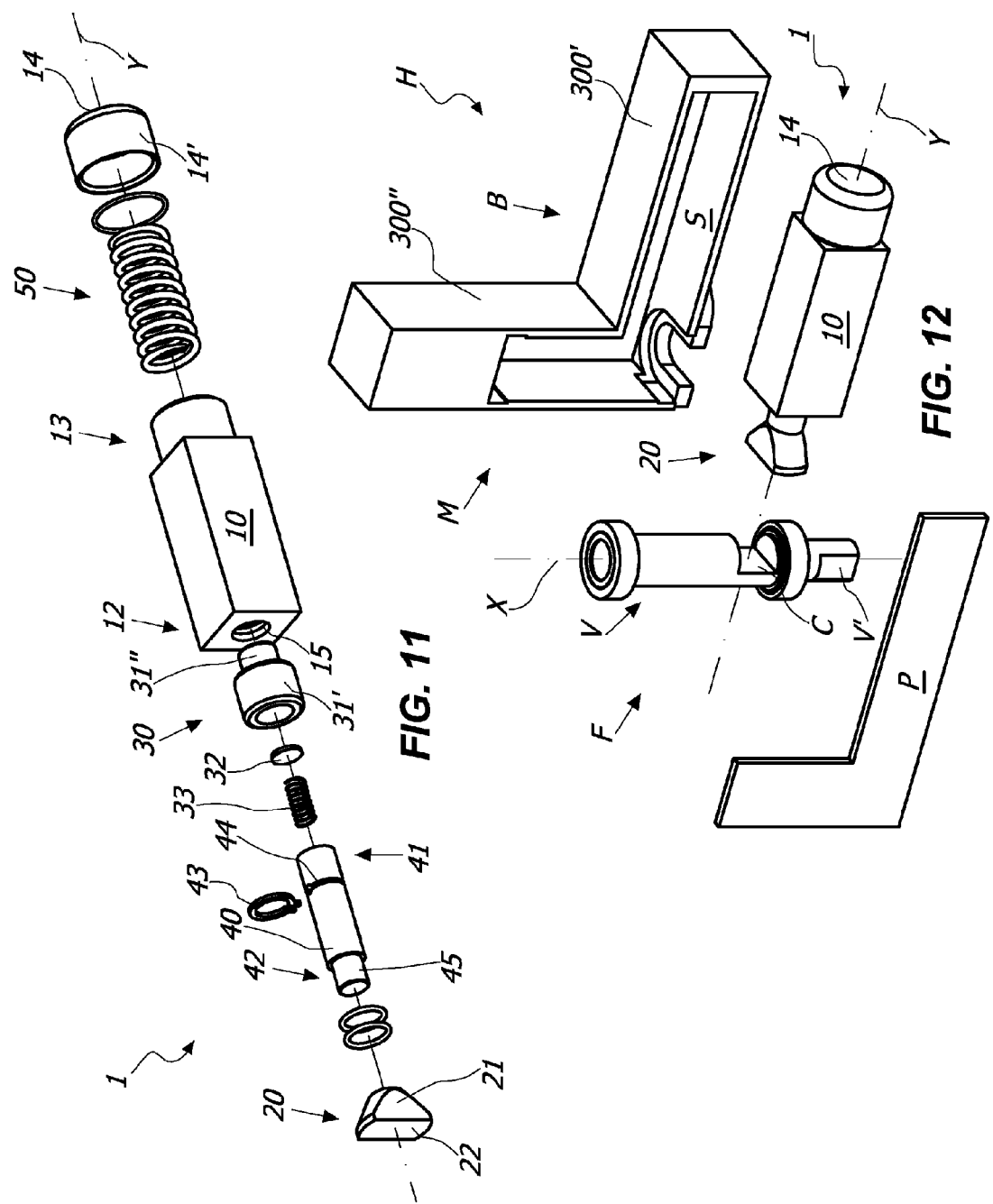

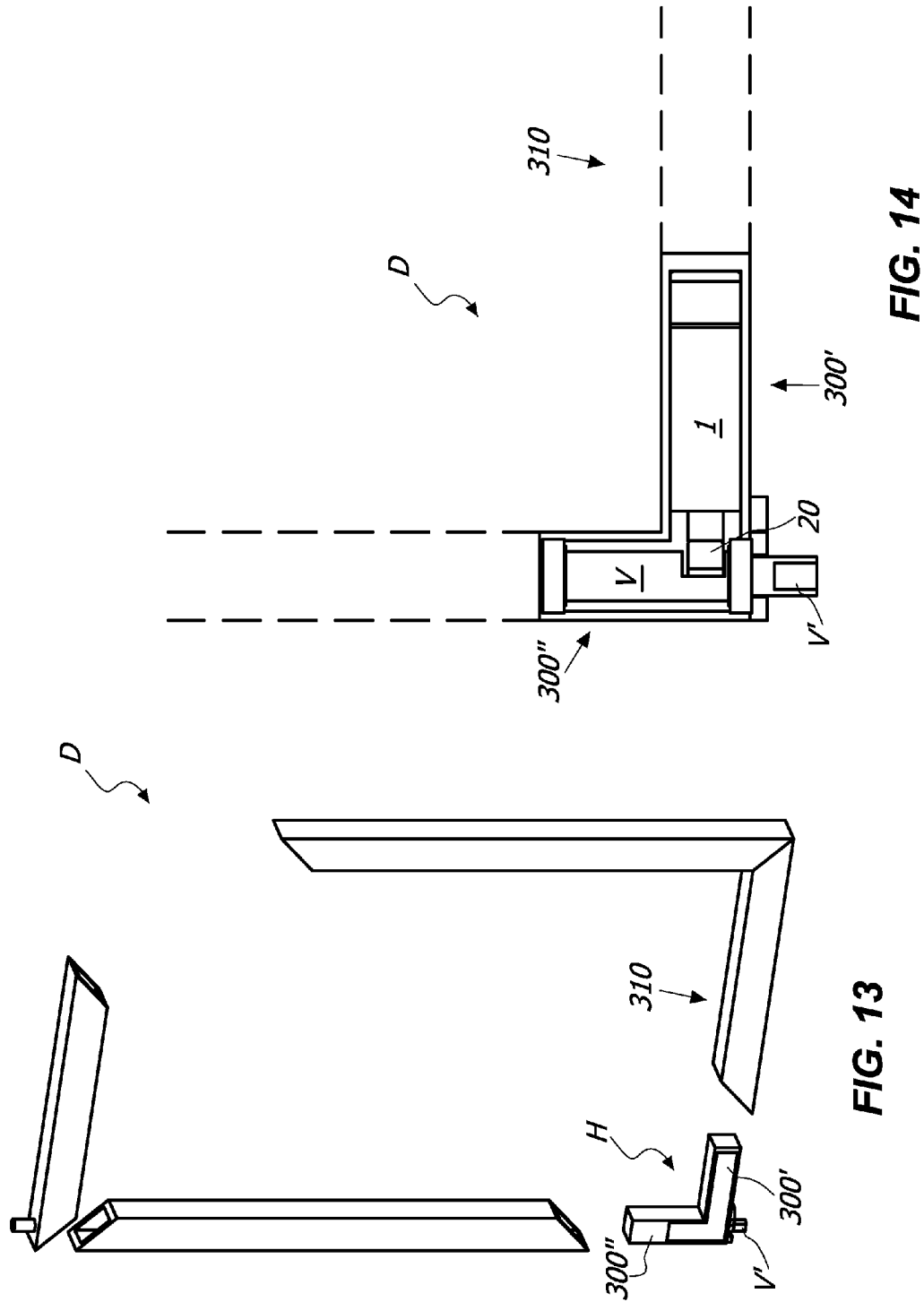

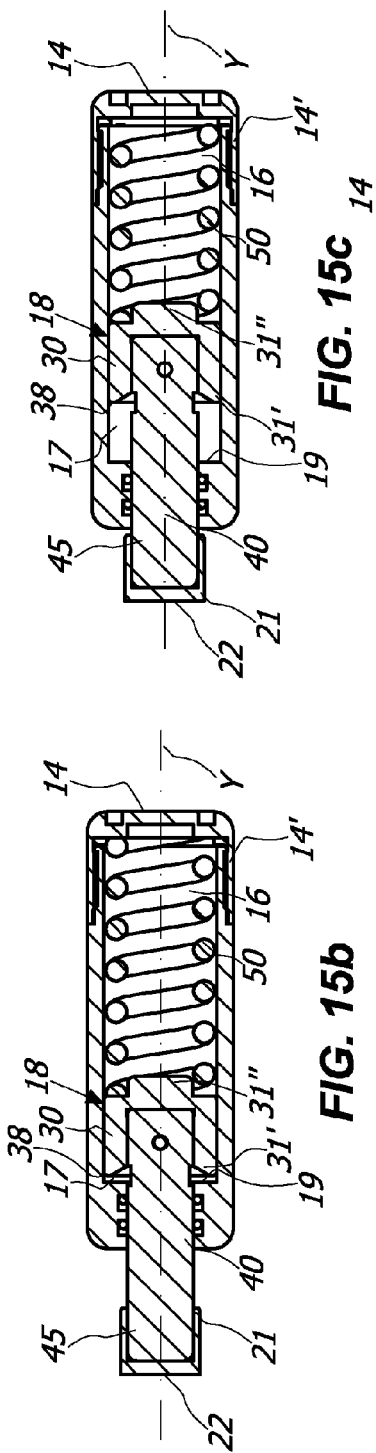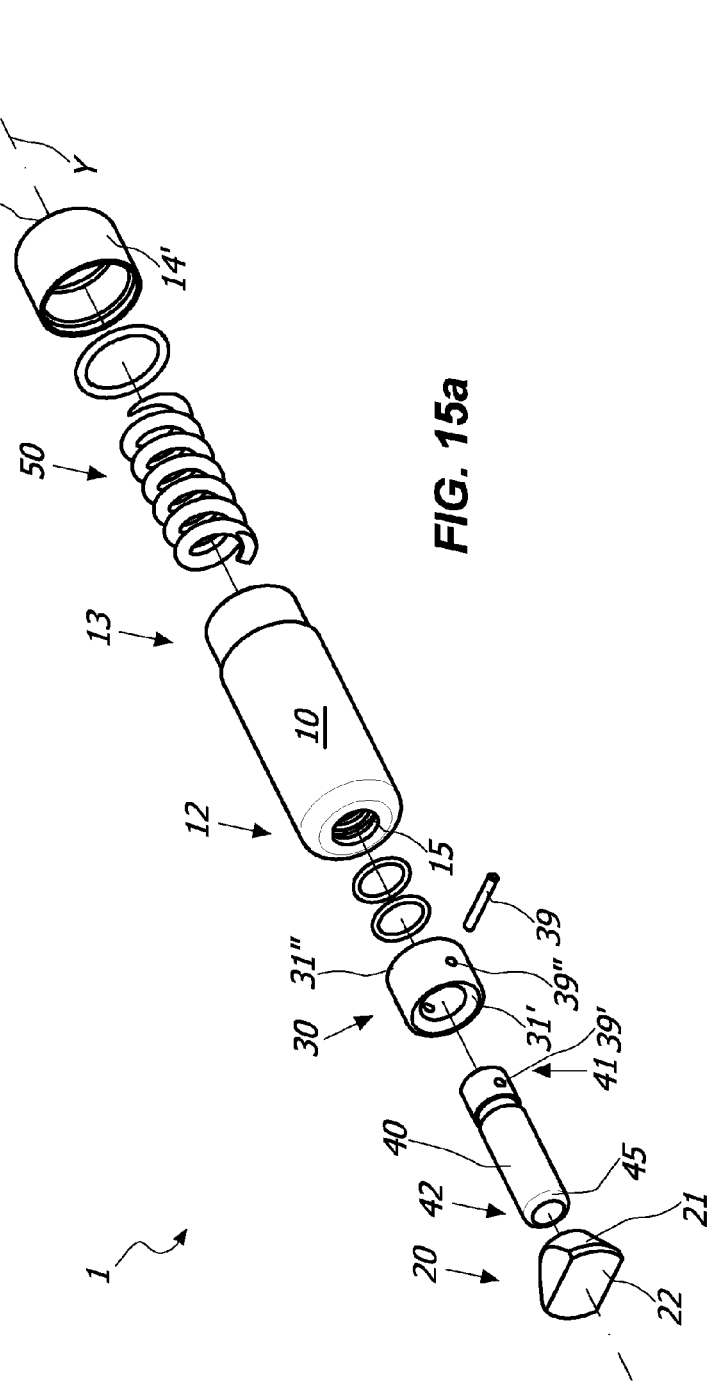

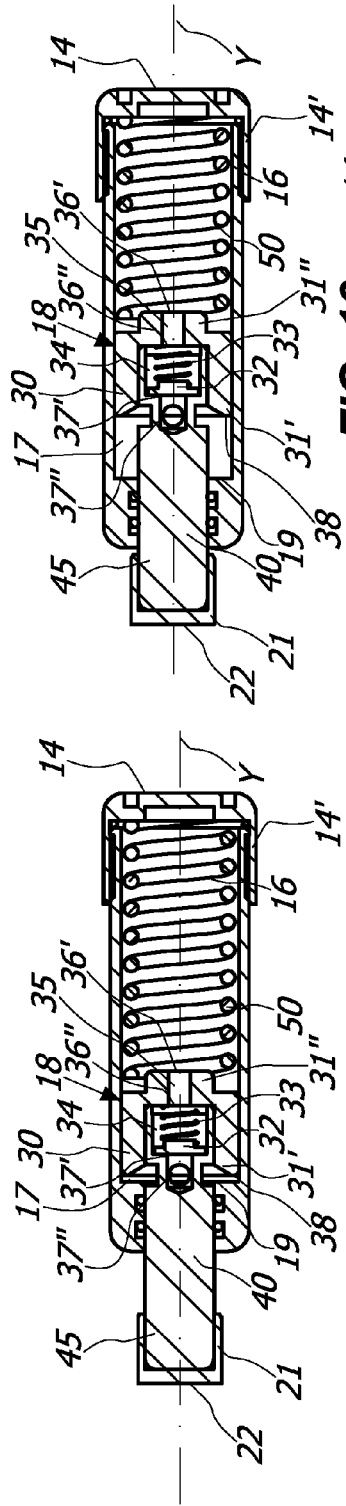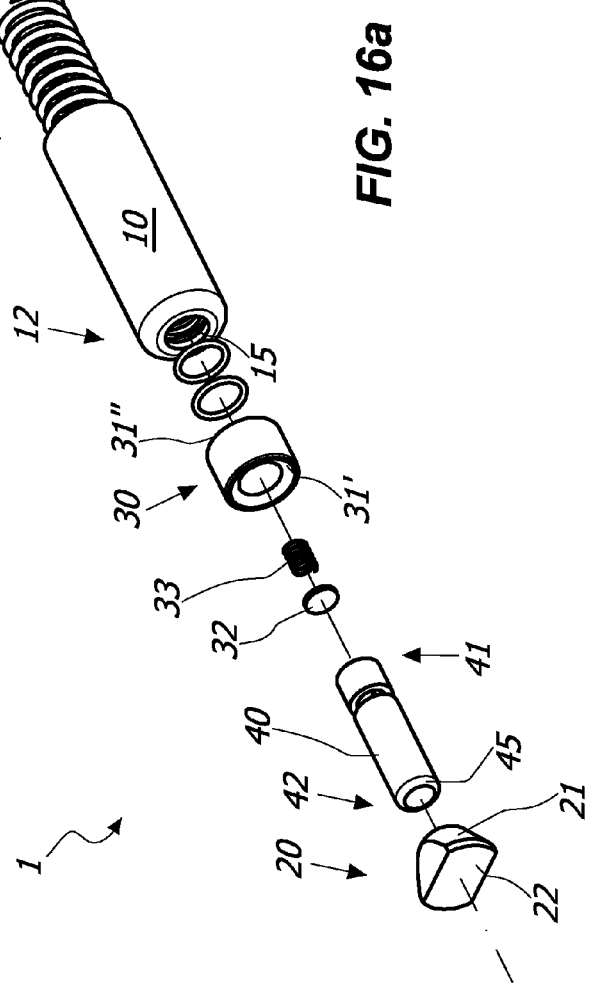

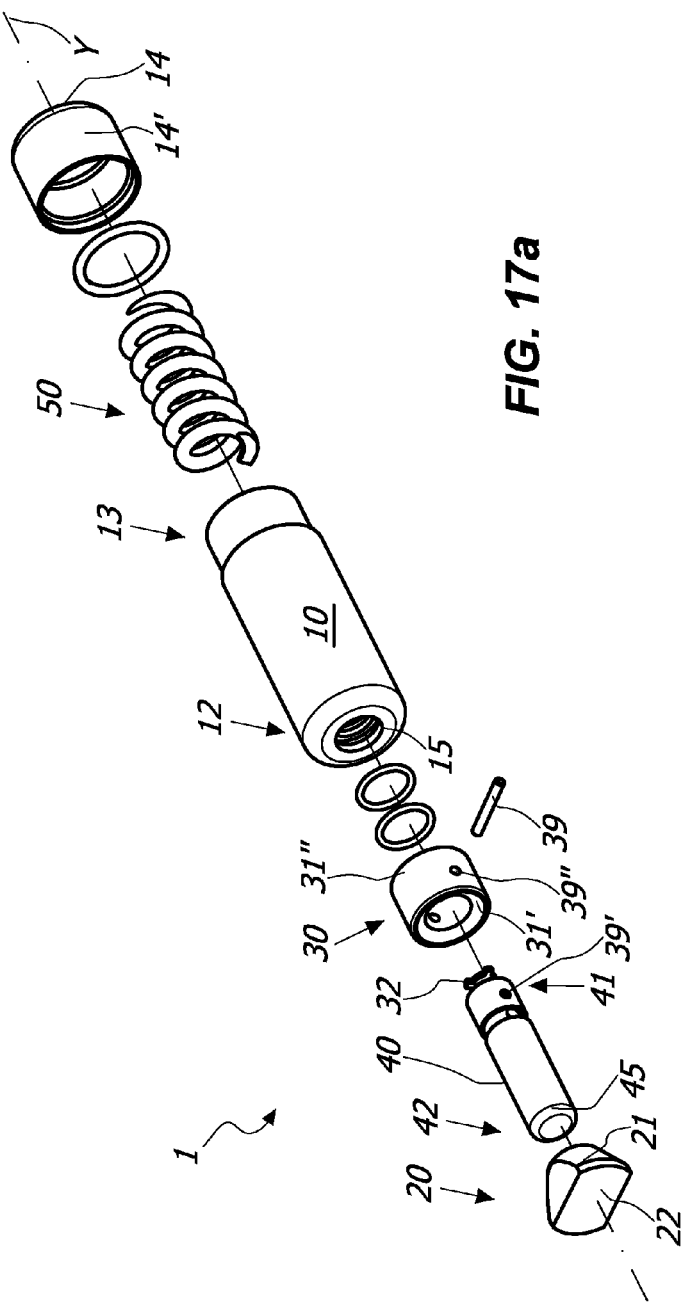

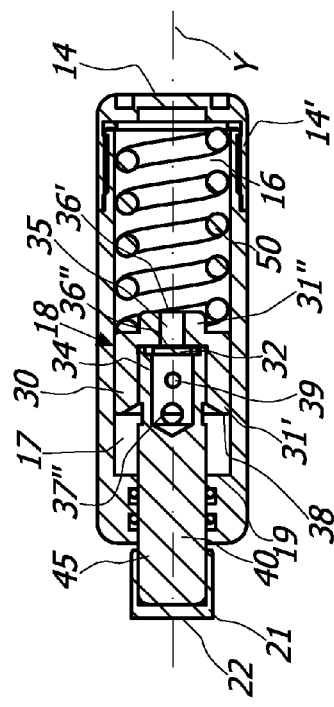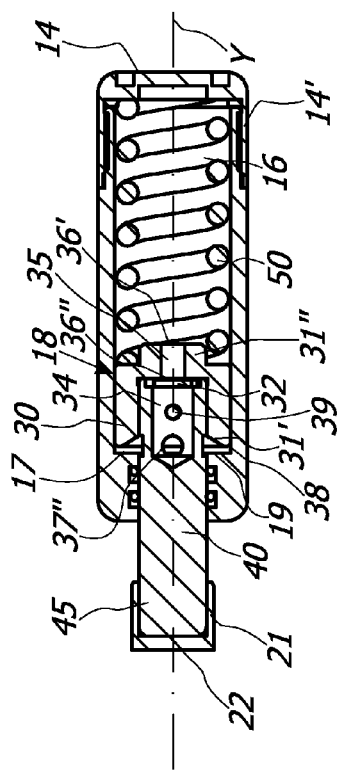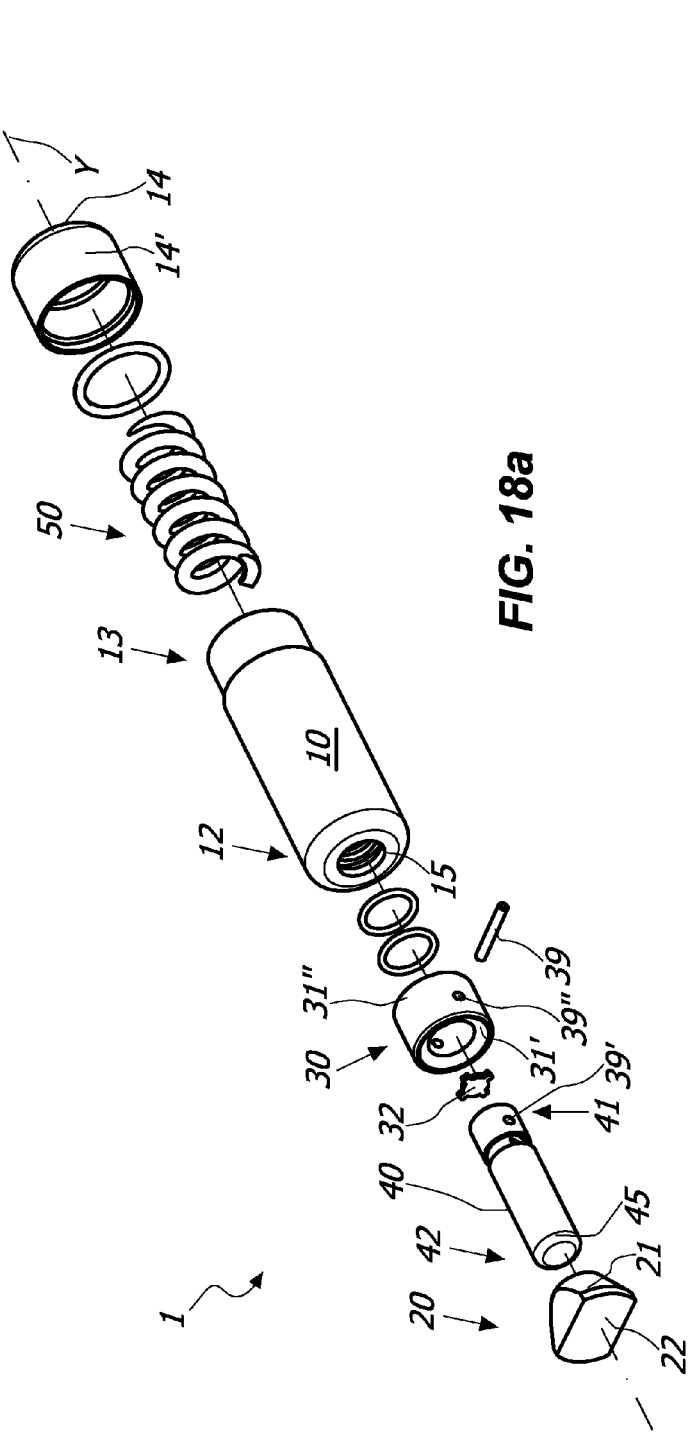

PISTON DEVICE FOR THE CONTROLLED ROTATABLE MOVEMENT OF DOORS, SHUTTERS OR LIKE MEMBERS

FIELD OF THE INVENTION

The present invention is generally applicable to the technical field of the closing or damping hinges, and particularly relates to a piston device for the contolled rotatably movement of a closing element, such as a door, a shutter or the like, anchored to a stationary support structure, such as a wall, a frame and/or a floor.

The invention further relates to a hinge device which includes the above piston device, as well as to an assembly thereof.

BACKGROUND OF THE INVENTION

As known, the closing or damping hinges generally comprise a movable element, usually fixed to a door, a shutter or the like, pivoted on a fix element, usually fixed to the support frame thereof, or to a wall and/or to the floor.

Usually, such hinges comprise a cam element which interacts with a plunger member slidably movable in a operative chamber within the fixed or mobile element.

Moreover, elastic contrast means acting on the plunger member and a working fluid, usually oil, adapted to hydraulically counteract the action thereof are provided, thus controlling the rotation of the door, the shutter or the like.

From the international applications WO2007/125524 and WO2011/016000 exemplary embodiments of these hinges are known, which have a pivot defining a substantially vertical axis perpendicular to the horizontal sliding axis of the plunger member.

Although these hinges have high functionality and reliability, they have the recognized drawback that the plunger member is insertable in correspondence of the rear portion of the hinge body, after the making the operating chamber by a difficult deburring maching process and internal thread thereof to allow the screwing of the closure cap.

Such process, long, difficult and hence expensive per se, is even more difficult by the fact that the plunger member moves in an oil bath, so that the machining tolerances must be very low.

In these conditions, it is self-evident that the shape of the hinge body is strongly conditioned by the presence of the closure cap.

Moreover, the materials to be used must be of the best quality, since any maintenance and replacement of the internal mechanical members is extremely difficult and require, in any case, the dismounting of the door, shutter or the like from the hinge device, and of the latter from the support structure to which it is coupled.

Further, the overall dimensions of the hinge device are strongly influenced by the above described processing.

From the documents U.S. Pat. No. 2,588,010 and US2010/024159 door closers are known in which the plunger member is mounted in a tubular member fixed to the main body of the same door closer.

These devices have high dimensions, in particular due to the shape of the respective cam elements.

Moreover, in case of maintenance or replacement they require the dismounting of the door, shutter or the like to which they are coupled.

SUMMARY OF THE INVENTION

A main object of the present invention is to overcome at least partly the above mentioned drawbacks, by providing a piston device and/or a hinge device and/or an assembly thereof of high functionality, simple construction and low cost.

Another object of the invention is to provide a piston device that allows to male a hinge device of any external shape.

Another object of the invention is to provide a piston device and/or a hinge device and/or an assembly thereof having extremely small dimensions.

Another object of the invention is to provide a piston device and/or a hinge device and/or an assembly thereof which ensures the automatic closing of the door from the open door position.

Another object of the invention is to provide a piston device and/or a hinge device and/or an assembly thereof which ensures the controlled movement of the door to which it is connected, both during opening and closing.

Another object of the invention is to provide a piston device and/or a hinge device and/or an assembly thereof which is capable of moving also very heavy doors and windows without changing its behaviour and without the need for adjustments.

Another object of the invention is to provide a piston device and/or a hinge device and/or an assembly thereof which has a minimum number of constituent parts.

Another object of the invention is to provide a piston device and/or a hinge device and/or an assembly thereof capable to maintain over time the exact closing position.

Another object of the invention is to provide a piston device and/or a hinge device and/or an assembly thereof that is safe.

Another object of the invention is to provide a piston device and/or a hinge device and/or an assembly thereof which is easy to install.

Another object of the invention is to provide a piston device and/or a hinge device and/or an assembly thereof that simplifies the maintenance and/or replacement operations.

Another object of the invention is to provide a hinge device which allows simple adjustment of the closed position of the door, shutter or the like to which it is connected.

These and other objects, as better explained hereafter, are fulfilled by a piston device and/or a hinge device and/or an assembly thereof having one or more of the features herein disclosed, claimed and/or shown.

Advantageous embodiments of the invention are defined in accordance with the dependent claims.

BRIEF DESCRIPTION OF THE DRAWINGS

Further features and advantages of the invention will appear more evident upon reading the detailed description of some preferred, non-exclusive embodiments of a piston device and/or a hinge device and/or an assembly thereof according to the invention, which is described as non-limiting examples with the help of the annexed drawings, in which:

FIG. 1a is an exploded axonometric view of a first embodiment of the piston device 1, with in FIG. 1b a side view of the device of FIG. 1a in an assembled configuration and in FIGS. 1c and 1d some sectional views of the device of FIG. 1b taken along respective planes indicated Ic-Ic and Id-Id;

FIG. 2a is an exploded axonometric view of a second embodiment of the piston device 1, with in FIG. 2b a side view of the device of FIG. 2a in an assembled configuration and in FIGS. 2c and 2d some sectional views of the device of FIG. 2b taken along respective planes indicated IIc-IIc and IId-IId;

FIGS. 5a, 5b and 5c are respectively top and sectioned along respective planes indicated Vb-Vb and Vc-Vc views of the hinge device H with the moving element M in the open position;

FIGS. 7a to 7f are axonometric and radially sectioned views of some embodiments of the pivot member V of the hinge device H, wherein FIGS. 7a and 7b show a first embodiment in which the substantially flat operative surface A lies on the median plane $\pi_M$, FIGS. 7c and 7d show a second embodiment in which the substantially flat operative surface A is offset with respect to the median plane $\pi_M$ and the edges E are rounded, FIGS. 7e and 7f show a third embodiment in which the substantially flat operative surface A is offset with respect to the median plane $\pi_M$ and the edges E are tapered;

FIGS. 10a, 10b and 10c are respectively sectioned, top and partially sectioned along a plane X-X views of a third embodiment of the hinge device H in which the angular position of the substantially flat operative surface A of the cam element C is adjustable;

FIG. 11 is an exploded axonometric view of a further embodiment of the piston device 1;

FIG. 12 is an exploded axonometric view of a further embodiment of a hinge device H susceptible to cooperate with the embodiment of the piston device 1 of FIG. 11;

FIG. 13 is an exploded axonometric view of a closing element D, in particular a gate, in which tubular frame 310 is inserted a hinge device H in accordance with the embodiment of FIG. 12;

FIG. 14 is an enlarged front view of a corner area of a closing element D, such as a swing gate or the door of a cold room, in which tubular frame 310 is directly inserted a piston device 1;

FIGS. 15a, 15b and 15c are respectively exploded axonometric and axially sectioned views with the actuating head 20 respectively in the distal and proximal position of a further embodiment of the piston device 1;

FIGS. 16a, 16b and 16c are respectively exploded axonometric and axially sectioned views with the actuating head 20 respectively in the distal and proximal position of a further embodiment of the piston device 1;

FIGS. 17a, 17b and 17c are respectively exploded axonometric and axially sectioned views with the actuating head 20 respectively in the distal and proximal position of a further embodiment of the piston device 1;

FIGS. 18a, 18b and 18c are respectively exploded axonometric and axially sectioned views with the actuating head 20 respectively in the distal and proximal position of a further embodiment of the piston device 1;

DETAILED DESCRIPTION OF SOME PREFERRED EMBODIMENTS

With reference to the annexed figures, the piston device according to the invention, generally indicated with 1, is particularly useful for the controlled rotatably movement of a closing element D, such as a door, a shutter or the like, during closing and/or during opening thereof, which closing element may be anchored to a stationary support structure W, such as a wall, a door or window frame and/or a floor.

To this end, the piston device is advantageously to be used with a hinge device H which includes a fix element F anchorable to the stationary support structure W and a movable element M anchorable to the closure element D. As per se known, the fix element F and the movable one M can be mutually coupled to rotate about an axis X, which may be substantially vertical, between an open position and a closed position.

The piston device 1 and/or the hinge device H may be particularly useful for rotatably moving glass doors.

The annexed figures show various embodiments of the invention. Unless otherwise specified, it is understood that features which are common to several embodiments may be indicated with a single identification mark, whether number or letter.

Figure 3A:
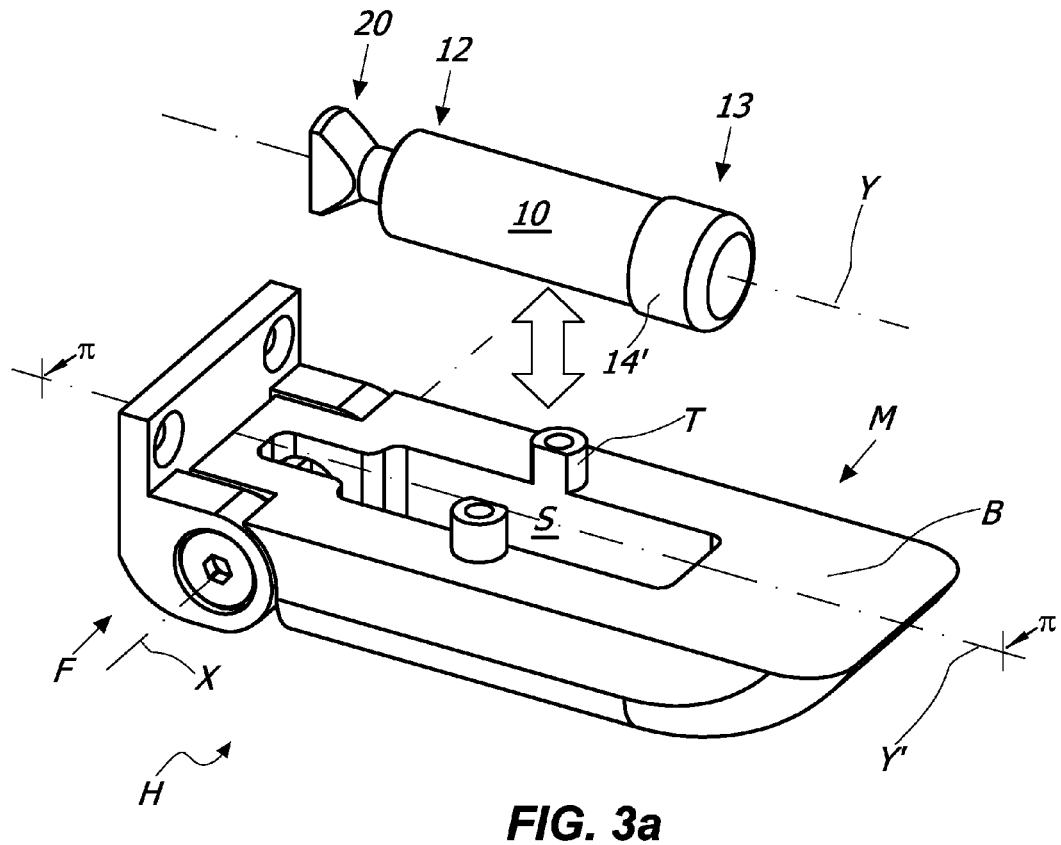
FIGS. 3a and 3b are respectively axonometric and side views of the piston device 1, respectively before and after the insertion thereof into the seat S of the hinge body B of the hinge device H.
Figure 3B:
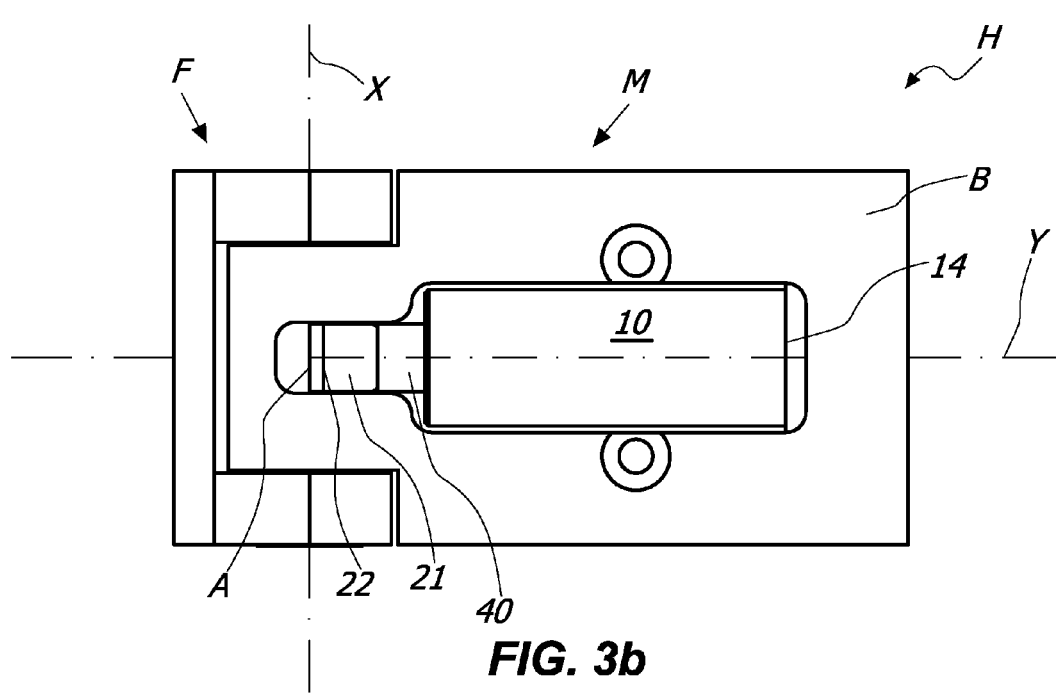

As particularly shown in FIGS. 3a and 3b, the hinge device H may include a hinge body B with a seat S, which may preferably be countershaped with respect to the piston device 1, so as to allow the removable insertion thereof within the hinge device H and/or the removal therefrom.

To do this, the plate P which may be coupled to the hinge body B by means of the screw means T may be removed.

Conveniently, the seat S may have an elongated shape to define an axis Y' substantially perpendicular to the axis X.

It is understood that the hinge body B may include one or more seats S each one including a respective piston devices 1 without departing from the scope of protection defined by the appended claims.

The hinge device H may also include a cam element C, faced to the seat S to interact with the piston device 1. Moreover, the cam element C may suitably be integrally movable with a pivot member V defining the axis X, and can include a substantially flat operative surface A susceptible to interact with the piston device 1.

Figure 19:
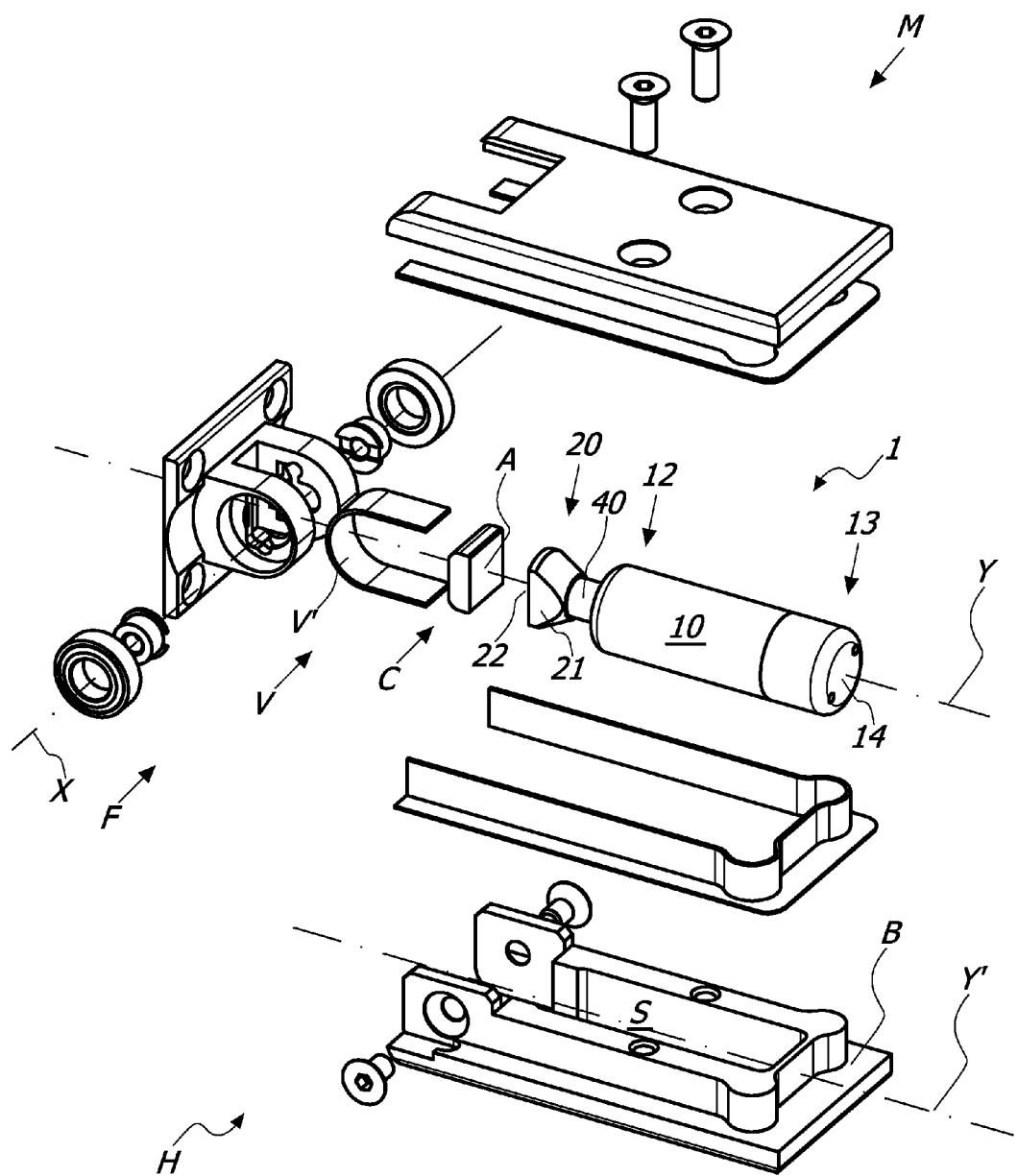
FIG. 19 is an exploded axonometric view of a further embodiment of the hinge device H.

The pivot member V may have any shape. In particular, the cam element C may be made of one piece with the pivot member V, as shown for example in FIGS. 7a to 7f, or may be unitary connected to a support V', as shown for example in FIG. 19.

Figure 7A:
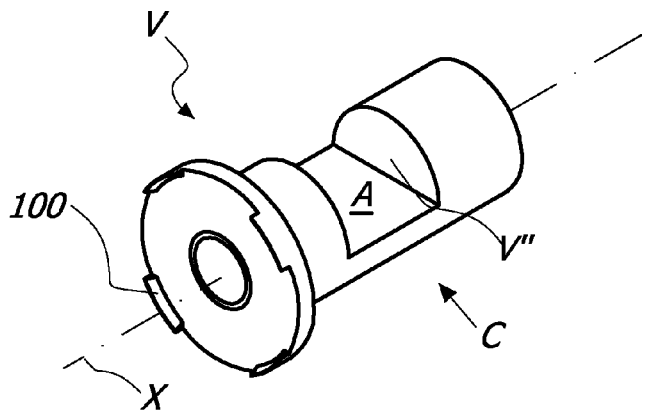
Figure 7B:
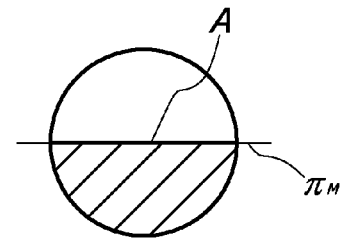

As shown by way of example in FIGS. 7a to 7f, the substantially flat operative surface A may have any position with respect to the median plane $\pi_M$ passing through the axis X and perpendicular to the axis Y'. In particular, the substantially flat operative surface A may precisely lie on the median plane $\pi_M$, as shown in FIGS. 7a and 7b, or may be offset with respect to the latter, whether the former surface A is behind the latter plane $\pi_M$, in accordance with the teachings of the international applications WO2007/125524 and WO2011/016000, or above it, as shown in FIGS. from 7c to 7f.

Figure 7C:
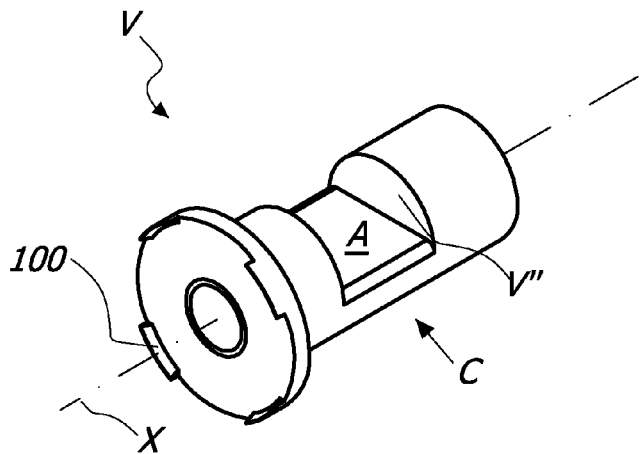
Figure 7D:
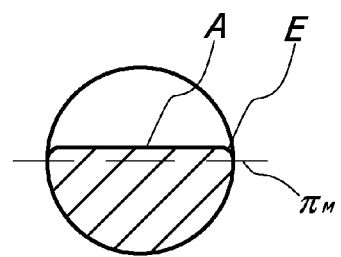
Figure 7E:
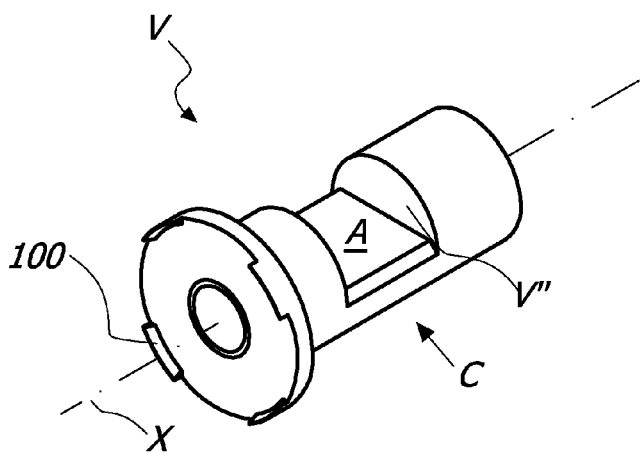
Figure 7F:
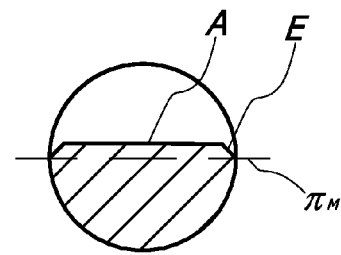
Figure 8A:
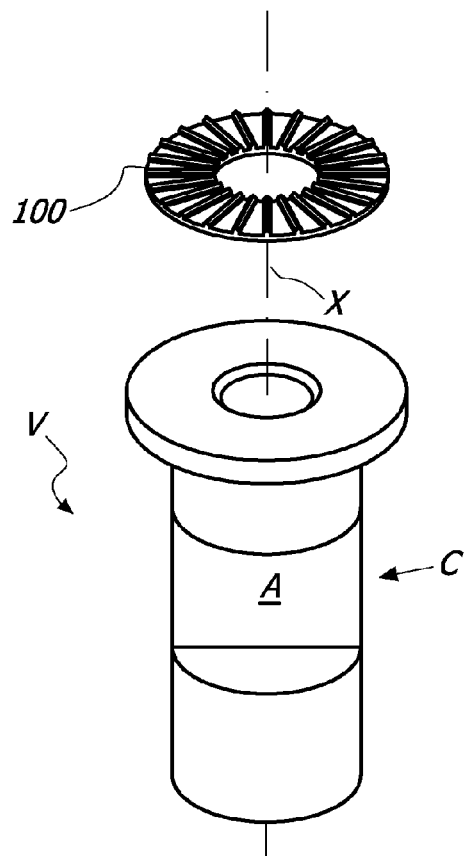
FIGS. 8a to 8c are axonometric views of further embodiments of the pivot member V of the hinge device H which includes the projections 100.
Figure 8B:
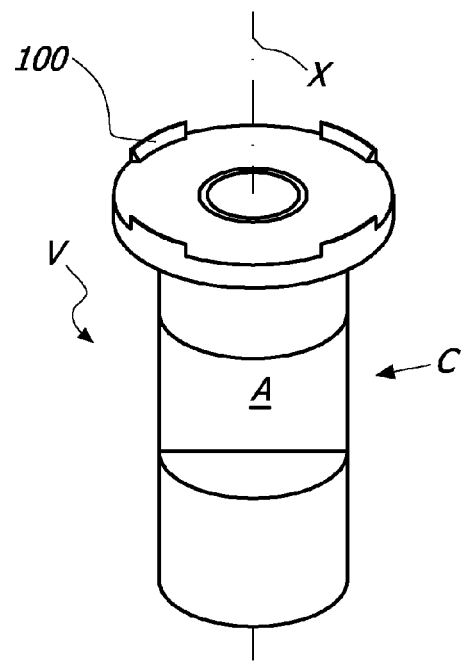
Figure 8C:
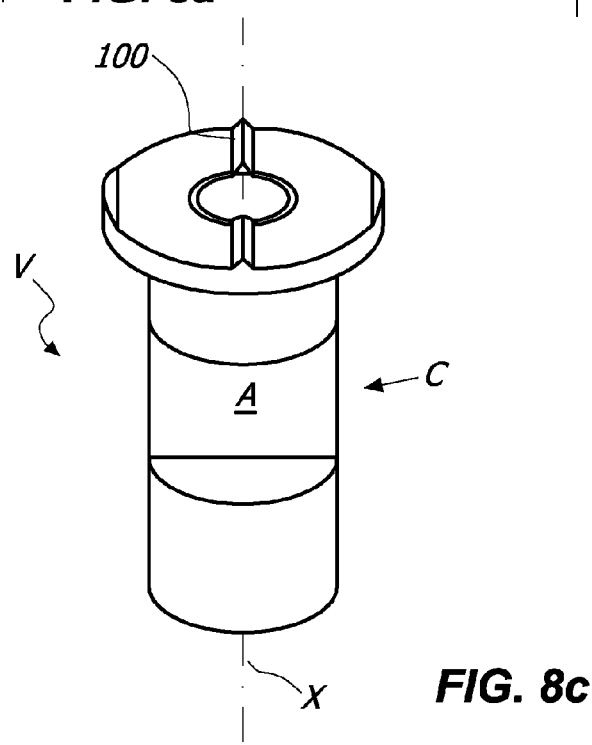
Figure 9A:
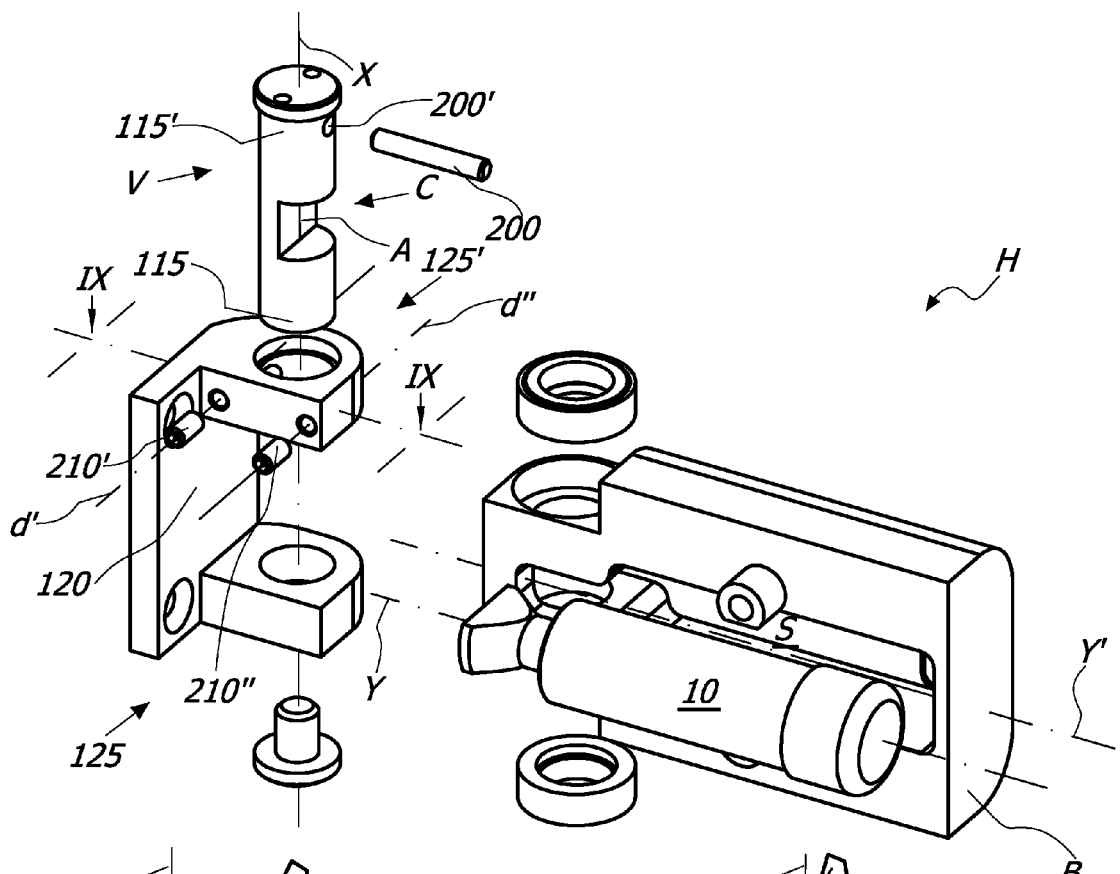
FIGS. 9a, 9b and 9c are respectively sectioned, top and partially sectioned along a plane IX-IX views of a second embodiment of the hinge device H in which the angular position of the substantially flat operative surface A of the cam element C is adjustable.
Figure 9B:
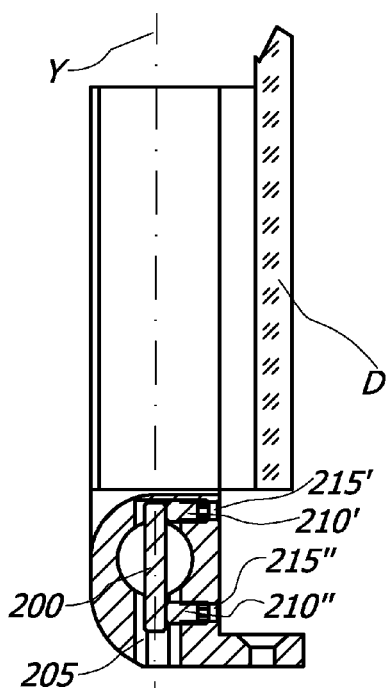
Figure 9C:
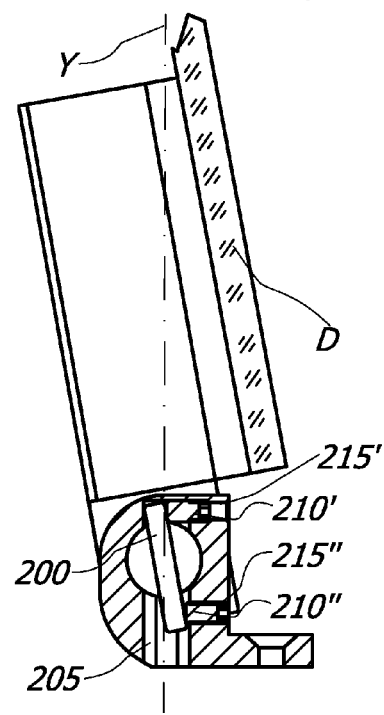

Further, the latter embodiments may have edges E both rounded, as shown in FIGS. 7c and 7d, so that the closure element always closes automatically also from the completely open position, and tapered, as shown in FIGS. 7e and 7f, so that the closure element has a stop position in the open position.

Advantageously, the cam element C may be made according to the teachings of the international application WO2007/125524 and WO2011/016000, which is referred to for proper consultation.

The piston device 1 may include a tubular body 10, preferably of cylindrical or parallelepiped-like shape, having a front portion 12 susceptible to be faced towards the substantially flat operative surface A of the hinge device H and a rear portion 13 which includes a bottom wall 14.

The annexed figures show two embodiments of the piston device 1.

In a first embodiment, shown by way of example in FIGS. 2a to 2d, the tubular body 10 may include a single closing cap 14', located in correspondence of the rear portion 13 and which may at least partially define the bottom wall 14.

On the other said in a second embodiment, shown by way of example in FIGS. 1a to 1d, the tubular body 10 may include both the closing cap 14' in correspondence with the rear portion 13 and a further closing cap 14" located in correspondence of the front portion 12.

The first embodiment with the single closing cap 14' has the advantage of having smaller dimensions than the second embodiment.

The tubular body 10, which may be removably insertable into the seat S of the hinge body B, may suitably include an operating chamber 15 defining a longitudinal axis Y.

Conveniently, as particularly shown in FIG. 3a, the hinge body B of the hinge device H, and in particular its seat S, may be configured to allow the insertion/disinsertion of the piston device into/from the seat S by sliding along a plane π substantially perpendicular to the axis X and substantially parallel to the axis Y'.

Once the piston device 1 is inserted into the seat S the axis Y of the former coincides with the axis Y' of the latter.

The piston device 1 may further include a actuating head 20, external to the tubular body 10, which may remain faced to the cam element C of the hinge device H to interact therewith.

To do this, the actuating head 20 may include a biasing element 21 with a substantially flat pushing face 22 adapted to interact with the substantially flat operatve surface A of the pivot member V. The biasing element 21 may be configured so as to complementarily fit in the compartment V''' of the pivot member V that includes the substantially flat operatve surface A.

Figure 20A:
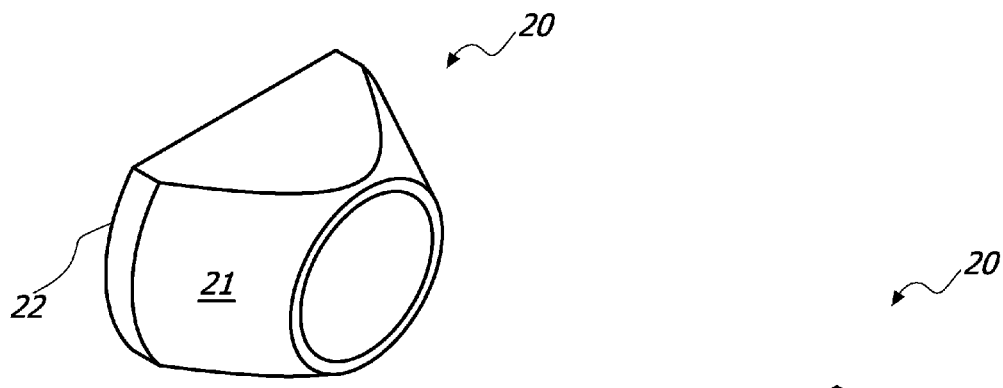
FIGS. 20a, 20b and 20c are axonometric views of some embodiments of the actuating head 20.
Figure 20B:
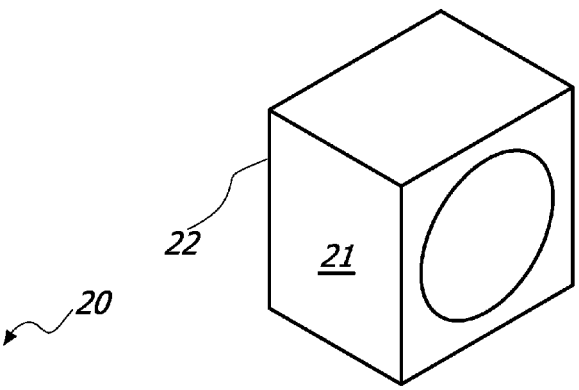
Figure 20C:
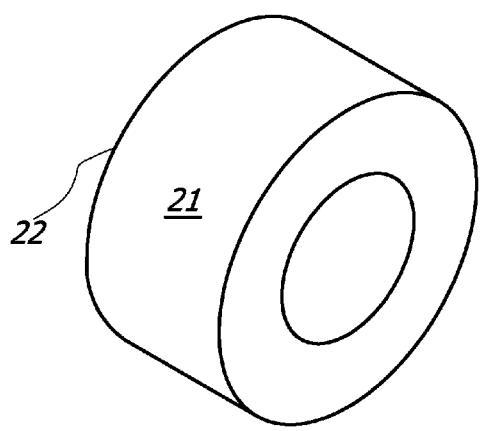

As particularly shown in FIGS. 20a, 20b and 20c, the biasing element 21 may have any shape, for example trapezoid-like, parallelepiped-like, cylindrical or disk-shaped.

However, the biasing element 21 may advantageously have a generally plate-like shape, in accordance with the teachings of the international application WO2011016000, which is referred to for proper consultation.

Figure 4A:
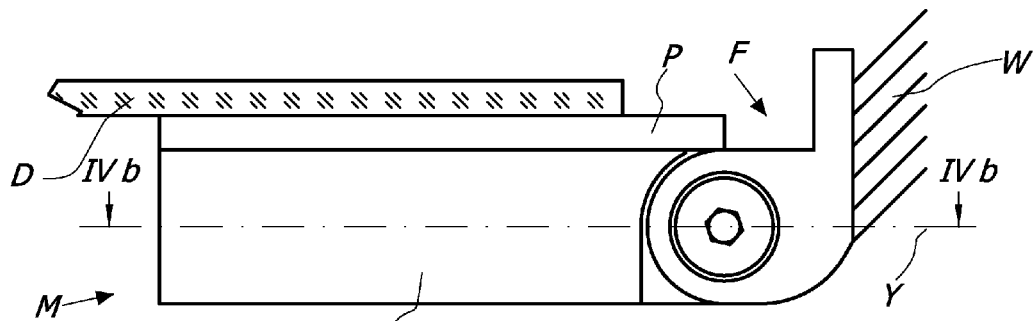
FIGS. 4a, 4b and 4c are respectively top and sectioned along respective planes indicated IVb-IVb and IVc-IVc views of the hinge device H with the moving element M in the closed position.
Figure 4B:
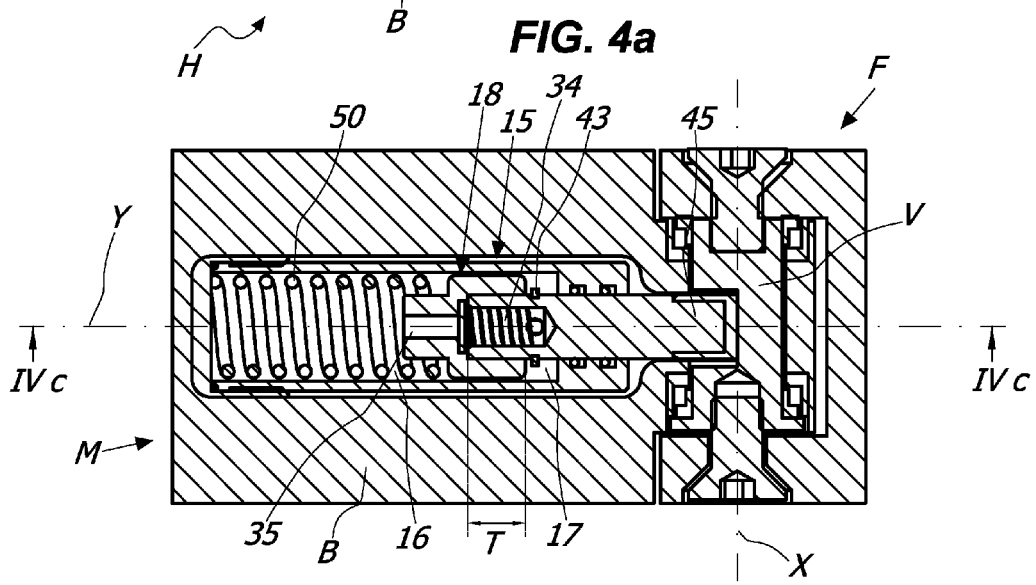
Figure 4C:
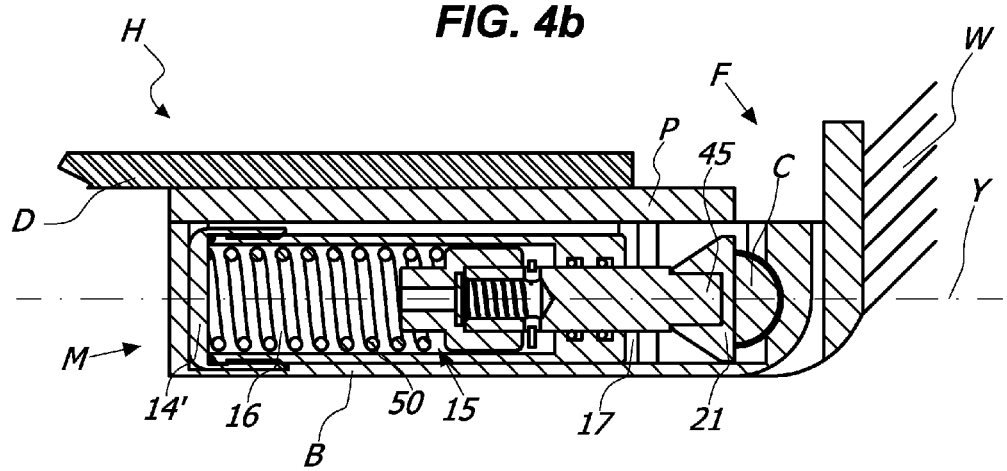
Figure 6A:
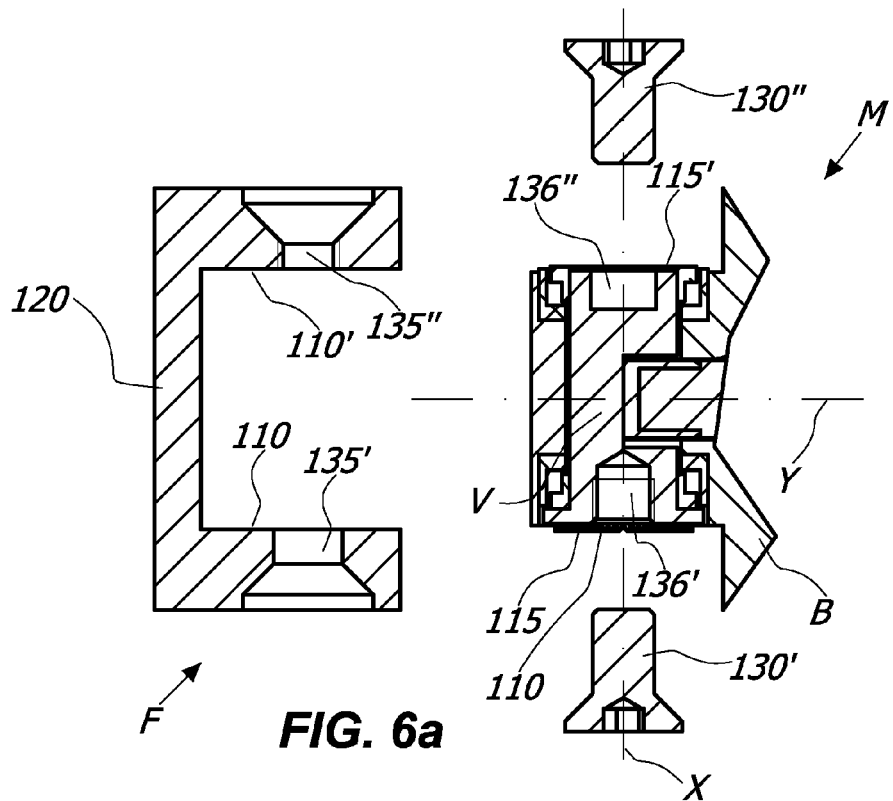
FIGS. 6a and 6b are sectional views respectively totally and partially exploded of a first embodiment of the hinge device H in which the angular position of the substantially flat operative surface A of the cam element C is adjustable.
Figure 6B:
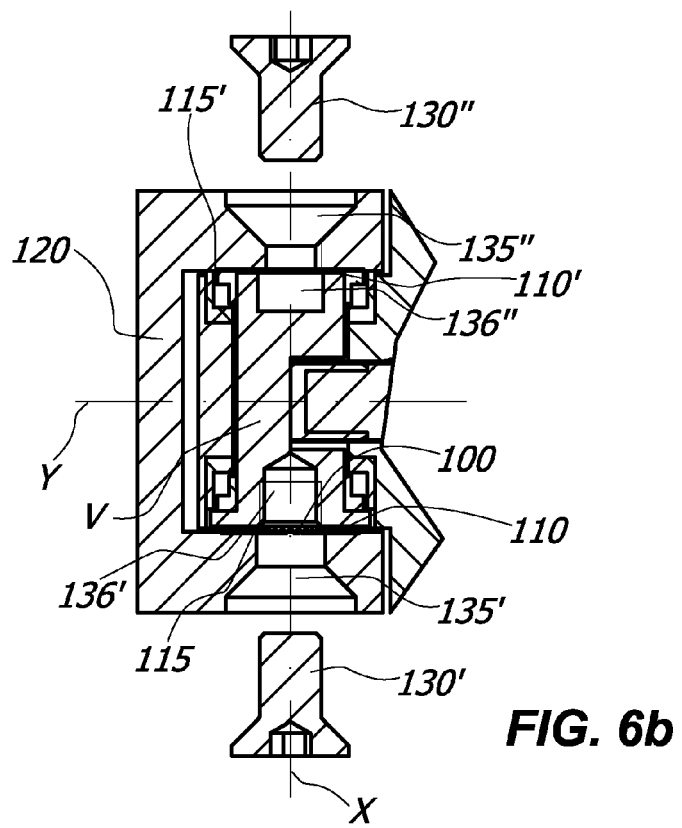

The piston device 1 may further include a plunger member 30 slidably movable in the operating chamber 15 along the axis Y between a retracted end position, shown in FIGS. 5a to 5c, and an extended end position, shown in FIGS. 4a to 4c.

Although in the particular embodiment shown in the attached figures the retracted end position of the plunger member 30 corresponds to the open position of the movable element M and the extended end position corresponds to the closed position thereof, it is understood that it may be possible also the opposite, i.e. that the extended end position of the plunger member 30 corresponds to the open position of the movable element M and the retracted end position corresponds to the closed position thereof, without departing from the scope of protection expressed by the appended claims.

Conveniently, the actuating head 20 and the plunger member 30 may be mutually connected to unitary move along the axis Y.

In particular, the actuating head 20 may move unitary with the plunger member 30 between a position which is proximal to the front portion 12 of the tubular body 10, corresponding to the retracted end position of the plunger member 30, and a position distal therefrom, corresponding to the extended end position of the plunger member 30.

To this end, a rod 40 may be provided passing through the front portion 12 of the tubular body 10 so as to be telescopically coupled therewith. The rod 40 may include a first end 41 within the operating chamber 15 coupled with the plunger member 30 and a second end 42 external to the operating chamber 15 coupled with the actuating head 20.

Conveniently, the operating chamber 15 may include elastic contrast means, for example a compression spring 50, acting on the plunger member 30 to return it from the retracted end position toward the extended end position. In this way, the spring 50 moves the actuating head 20 from the proximal position to the distal one.

In other words, the elastic contrast means 50 may be configured to move between a position of maximum and minimum elongation, the positions of maximum and minimum elongation thereof respectively coinciding with the distal and proximal positions of the actuating head 20.

Moreover, since the substantially flat operative surface A of the pivot member V and the front pushing face 22 of the actuating head 20 may be mechanically disconnected to each other, it is apparent that the elastic contrast means 50 cannot act on the contrary.

In other words, the elastic contrast means 50 cannot act on the plunger member 30 to return the actuating head 20 from the distal to proximal position, such as e.g. in the door closer according to the teachings of the documents U.S. Pat. No. 2,588,010 and US2010/024159.

It is understood that any other elastic means may be employed in place of the spring 50, for example a fluid cushion, without departing from the scope of protection expressed by the appended claims.

Conveniently, the operating chamber 15 may further include a working fluid, e.g. oil, acting on the plunger member 30 to hydraulically counteract the action of spring 50.

This way, the hinge device H control the rotation of the movable element M, both during opening and closing thereof.

More generally, the hinge device H ensures a controlled movement of the closure element D, both during opening and closing thereof.

This allows e.g. to prevent the closure element D during closing strongly impacts against the frame. Further, during opening the controlled movement prevents the closure element D to abruptly open, so as to protect both the door per se and any user who is in its action range.

The fact that the substantially flat operative surface A of the pivot member V and the front pushing face 22 of the actuating head 20 are mechanically disconnected to each other makes the piston device 1 and/or the hinge device H particularly useful for rotatably moving closure elements D made of a fragile material, such as glass doors.

In case of violent opening or closing of the door, for example caused by a child or by a blow wind, the movable element is always free to rotate independently from the bias of the resistance of the plunger member 30, thereby avoiding an abrupt blocking of the closing element D.

Depending on the configuration of the elastic contrast means 50 of the piston device 1, the hinge device H may act as a closing hinge or as a damping hinge for the control of the closure element D during opening and/or during closing thereof.

In the first case, the elastic contrast means 50 may be susceptible to act on the plunger member 30 to automatically return the movable element M from the open position toward the closed one.

In this case, the elastic contrast means 50 shall be dimensioned for this purpose, therefore, the person skilled in the art has to choose them so as to ensure the automatic closing of the closing element D from the open position.

Advantageously, the elastic contrast means 50 may include a bias spring.

It is understood that the closing hinge may also have the damping function, during opening and/or during closing.

In the second case, the elastic contrast means 50 may have the only function of returning the plunger member 30 from the retracted position to the extended one, and not also the function of closing the closure element D. As a consequence, they may have a lower power with respect to the first case.

Therefore, the person skilled in the art has to choose them to ensure such a function.

Suitably, the substantially flat operative surface A of the pivot member V and the front pushing face 22 of the actuating head 20 may be substantially parallel when the actuating head 20 is in the distal position and substantially perpendicular when the same actuating head 20 is in the proximal one.

The shape of the cam element C determines the position of the actuating head 20 upon the closing or the opening of the closure element D.

For example, in the embodiments shown in FIGS. 4a to 5b the distal position of the actuating head 20 may correspond to the closed position of the movable element M of the hinge device H, while the proximal position of the same actuating head 20 may correspond to the the open position of the movable element M of the hinge device H.

In this case, the pivot member V may include a single substantially flat operative surface A, which may be substantially parallel to the front pushing face 22 when the closure element D is in the closed position, while it may be substantially perpendicular to the front face 22 when the closure element D is in the open position.

Figure 21A:
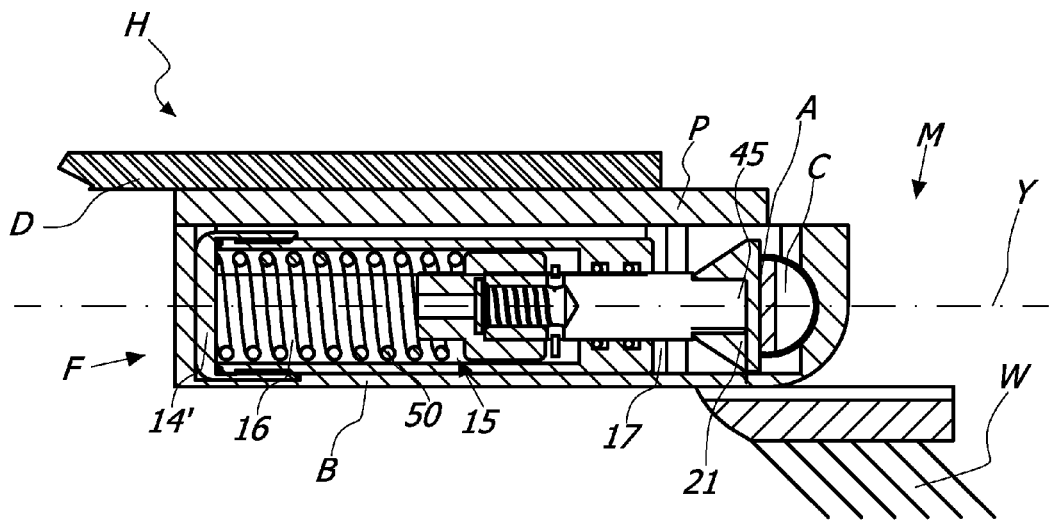
FIGS. 21a and 21b are axially sectioned views of a further embodiment of the hinge device H.
Figure 21B:
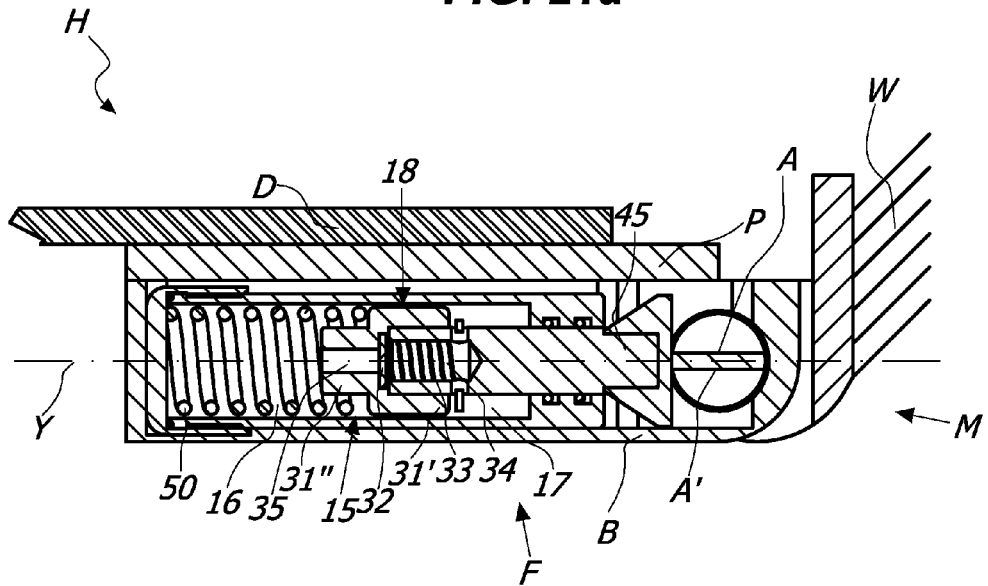

In a further embodiment of the invention, as shown in FIGS. 21a and 21b, the distal position of the actuating head 20 may correspond to the open position of the movable element M of the hinge device H, while the proximal position of the same actuating head 20 may correspond to the closed position of the movable element M of the hinge device H.

In this case, the pivot member V may include a pair of substantially flat operative surfaces A, A', which may be susceptible to selectively interact with the front pushing face 22 according to the opening direction of the closure element.

This operative surface A may be substantially parallel to the front pushing face 22 when the closure element D is in the open position, while it may be substantially perpendicular to the front face 22 when the closure element D is in the closed position.

Conveniently, the plunger member 30, which may include a tubular body with a front portion 31' and a rear portion 31" coupled with the spring 50, may be able to separate the operating chamber 15 in a first and a second variable volume compartments 16, 17, fluidly communicating with each other, and preferably reciprocally adjacent.

Advantageously, the spring 50 may be placed in the first compartment 16, so that the first and the second compartments 16, 17 may have respectively the maximum and minimum volume at the distal position of the actuating head 20, and the minimum and maximum volume at the proximal position thereof.

Advantageously, the plunger member 30 may be inserted in the operating chamber 15 so as to define therewith an interspace 18 for the passage of the working fluid between the first and the second compartments 16, 17.

In other words, the interspace 18 may at least partially define a circuit for the passage of the working fluid between the first and the second compartments 16, 17.

Conveniently, the plunger member 30 may be inserted in the operating chamber 15 with a predetermined clearance, which may be of a few tenths of a millimeter, so that the interspace 18 may have a tubular shape.

On the other hand, the plunger member 30 may be inserted in the operating chamber 15 substantially without clearance, so that the interspace 18 may be defined by one or more tapered portion made on the plunger member 30.

In a preferred but not exclusive embodiment, shown in FIGS. from the 15a to 15c, the working fluid may pass between the first and the second compartments 16, 17 exclusively through the interspace 18, both upon opening of the closure element D and upon the closing thereof.

Conveniently, the plunger member 30 may include valve means for controlling the passage of the working fluid between the first and the second compartments 16, 17 upon rotation of the movable element M in the opening or closing direction.

In a preferred but not exclusive embodiment, the valve means, which may be of the one-way type, may include a disk 32 and, possibly, a correspondent contrast spring 33.

The absence or presence of the contrast spring 33 may determine the greater or lesser progressivity of the damping effect of the piston device 1.

For example, in the embodiment shown in FIGS. 16a to 16c the valve means include the contrast spring 33, while in the embodiment shown in FIGS. from 17a to 17c they are free of the latter.

Advantageously, the disc 32 and, if present, the relative spring 33 may be inserted in a suitable seat 34, defined by the blind hole in the rear portion 41 of the stem 40. The latter, in turn, is susceptible to engage the front portion 31' of the plunger member 30 for a portion T thereof.

The valve means may be inserted into the seat 34 so that the disc 32, possibly pushed by the spring 33, selectively blocks the passage of the working fluid between the first and second compartment 16, 17, forcing the fluid to pass through the interspace 18.

The passing-through hole 35 and the blind one 34 may be susceptible to put in mutual fluid communication the first and the second compartments 16, 17 passing through the disc 32, which controls the flow passage of working fluid.

Advantageously, the passing-through hole 35 may have a first opening 36' for the working fluid which is in the first compartment 16 and a second opening 36" to allow the passage of the working fluid.

The blind hole 34 may further have a first opening 37' which faces the second opening 36" of the passing-through hole 35 and a second opening 37" to allow the passage of the working fluid from/towards the second compartment 17.

The disc 32, possibly pushed by the spring 33, may be susceptible to selectively obstruct the opening 36" or 37'.

This configuration may allow to determine the passage of working fluid through the valve means 32, 33 and the interspace 18, thus controlling the damping effect of the piston device 1.

In fact, the valve means 32, 33 may be configured to control the passage of the working fluid between the first and the second compartments 16, 17 upon the passage of the actuating head 20 from from one between the proximal and distal postions towards the other between the proximal and distal postions, while the interspace 18 may allow the passage of the working fluid between the first and second compartments 16, 17 upon the moving back of the actuating head 20 from the other between the proximal and distal postions towards the starting one.

In a preferred but not exclusive embodiment, shown for example in FIGS. 1a to 2d, the disc 32 and the relative spring 33 may be configured to open upon the passage of the actuating head 20 from the distal position to proximal one, so as to allow the passage of the working fluid from the first compartment 16 to the second compartment 17, and to close upon the passage of the same actuating head 20 from the proximal position to the distal one, so as to force the passage of the working fluid from the second compartment 17 to the first compartment 16 through the interspace 18.

In this embodiment, the opening of the valve means may correspond to the opening of the movable element M, while the closing of the same valve means may correspond to the closing thereof.

On the other hand, in an alternative embodiment, shown for example in FIGS. 16a to 16c, the valve means may be configured to work on the contrary.

In fact, the valve means may open upon the passage of the actuating head 20 from the proximal position to the distal one, so as to allow the passage of the working fluid from the second compartment 17 to the first compartment 16, and may close upon the passage of the actuating head 20 from the distal position to the proximal one, so as to force the passage of the working fluid from the first compartment 16 to the second compartment 17 through the interspace 18.

Preferably, the biasing element 21 may be removably connected to the second portion 42 of the stem 40. To this end, the second portion 42 may have an elongated appendix 45 adapted to complementarily engage in a suitable seat of the biasing element 21.

This embodiment allows to minimize the manufacturing costs of the piston device 1. In fact, it is possible to manufacture the biasing element 21 in a first metal material having high mechanical properties, such as stainless steel, while the rod 40 may be made of a second metal material having relatively less mechanical properties, for example brass or aluminum.

In fact, the biasing element 21 may have to bear all the mechanical stress caused by the interaction with the cam element C. Further, the biasing element 21 may work substantially dry or anyway not in an oil bath, so that it wears more of the components that are in an oil bath.

Advantageously, the stem 40, the valve means 32 and 33, the plunger member 30 and the elastic contrast means 50 may be inserted sequentially "packed" into the tubular body 10, so as to be mutually coupled in the operating chamber 15 without screws or similar connecting means. This allows to minimize the overall dimensions and to maximize the duration of the piston device 1.

In order to prevent the decoupling of the stem 40 from the front part 12 of the tubular body 10, suitable decoupling-preventing means may be provided.

Conveniently, the decoupling-preventing means may include a stop element fixed to the rod 40 and/or to the plunger member 30 susceptible to impact against the inner wall 19 of the tubular body 10 faced to the bottom wall 14.

For example, as shown in FIGS. 1a to 2d, a blocking ring 43 preferably of the Seeger type may be provided.

The blocking ring 43 may be fitted on the rod 40 by inserton in a suitable annular seat 44. Advantageously, the position of the seat 44 on the rod 40 may be in a spatial relationship with the inserting portion T of the same rod 40 into the portion 31' of the plunger member 30 such that when the actuating head 20 is in the extended position, as shown in FIGS. 2c and 2d, the blocking ring 43 impacts against the wall 19 preventing the decoupling of the rod 40 from the plunger member 30.

On the other hand, as shown for example in FIGS. 15a to 18c, the stop element may include an abutment surface 38 of the plunger member 30 susceptible to impact with the inner wall 19.

In this case, the plunger member 30 and the rod 40 may be unitary connected to each other.

To this end, as shown for example in FIGS. 16a to 16c, the plunger member 30 and the rod 40 may be unitary coupled to each other by interference.

On the other hand, as shown for example in FIGS. 17a to 18c, a passing-through pin 39 insertable in corresponding seats 39', 39" of the rod 40 and of the plunger member 30 may be provided.

In a further aspect, as particularly shown in FIGS. 6a to 10c, the hinge device H may include means for adjusting the angular position of the substantially flat operative surface A of the pivot memeber V with respect to the axis Y.

It is understood that the adjustment means may equivalently be included in a hinge device H which includes the piston device 1 or in a hinge device in which the actuating head 20, the plunger member 30, the possible rod 40, the elastic contrast means 50 and the working fluid are inserted in a seat directly made within the hinge body, for example configured according to the teachings of the international applications WO2007/125524 and WO2011/016000.

In this case, the assembly of the actuating head 20, the plunger member 30, the possible rod 40, the elastic contrast means 50 and the working fluid may be unremovably anchored into the hinge body.

Advantageously, the hinge device H may include an anchoring element 120, which may have a substantially "C" shape, for anchoring thereof to the stationary support structure W or to the closure element D.

The anchoring element 120 may include an upper portion with a respective upper surface 110' and a lower portion with a respective lower surface 110 faced to respective ends 115, 115' of the pivot member V.

The upper and lower portions may be planar, substantially parallel to the axis Y' and substantially perpendicular to the axis X. The upper and lower portions may be joined to each other by means of a joining portion, which may preferably be planar, substantially parallel to the axis X and substantially perpendicular to the axis Y'.

In a first embodiment, shown in FIGS. 6a to 8c, the adjustment means may include one or more protrusions 100 in correspondence of the respective end 115 of the pivot member V adapted to engage the corresponding surface 110 of the anchoring element 120 faced thereto.

To this end, a first threaded screw 130' inserted in a corresponding unthreaded hole 135' passing through the anchoring element 120 may be provided, which may be susceptible to engage the pivot member V in a corresponding counterthreaded blind hole 136' in correspondence of the end 115 that includes the protrusions 100.

At the opposite end, a second threaded screw 130" engaged with a corresponding counterthreaded hole 135" passing through the anchoring element 120 may be provided, which may be inserted into a corresponding unthreaded blind hole 136" in correspondence of the respective end 115' of the pivot member V.

Therefore, to change the angular position of the substantially flat operative surface A of the pivot member V with respect to the axis Y may be sufficient to unscrew the screw 130', to rotate the anchoring element 120 about the X axis to the desired position and to screw the screw 130', so as to promote the penetration of the projections 100 into the surface 110.

In a second embodiment, shown in FIGS. 9a to 10b, the adjustment means may include a pin 200 inserted into a radial hole 200' passing through at least one of the ends 115, 115' of the pivot member V and in a corresponding radial hole 205 passing through the respective end 125 of the anchoring element 120. To this end, the pin 200 may have a length greater than the one of the radial hole 200' of the pivot member V.

Preferably, the radial hole 200' may be substantially perpendicular to the axis X and to the substantially flat operative surface A, while the radial hole 205 may be substantially parallel to the axis Y'.

The pin 200 may be susceptible to impact against one couple of abutment adjusting screws 210', 210" inserted into respective seats 215', 215" defining respective sliding directions d', d" thereof which may be substantially parallel to each other and substantially perpendicular to the axis X and to the axis Y'.

Suitably, the seats 215', 215" may be placed on only one side of the end 125 of the anchoring element 120 or on opposite sides thereof, as shown respectively in FIGS. 9a to 9c and 10a to 10c.

FIG. 11 shows a further embodiment of the piston device 1, having features similar to the embodiments shown in FIGS 1a and 2a, but having a tubular body 10 of generally parallelepiped-like shape.

This embodiment of the piston device 1 is particularly suitable to be inserted into the hinge device H shown in FIG. 12, which includes a hinge body B which defines the moving element M and a pivot member V defining the fix element F.

To this end, the pivot member V may include a shaped end portion V', insertable into a suitable countershaped seat made e.g. in a floor, not shown in the figures because per se known.

The hinge body B may include a first elongated portion 300' which is internally hollow to define the seat S for the removable insertion of the piston device 1. Preferably, the seat S may be countershaped with respect to the tubular body 10 of the parallelepiped-like piston device 1, so as to avoid rotation thereof about the axis Y.

The hinge body B may further include a second elongated portion 300" which is internally hollow to house the pivot member V, which may define the axis of rotation X of the hinge body B.

Advantageously, as particularly shown in FIG. 13, the first and/or the second elongated portions 300', 300", which may be substantially perpendicular to each other, may be slidably inserted in the tubular frame 310 of a closure element D hidden to the sight, such as a swing gate or a shutter of a cold room.

It is understood that the embodiment of the hinge device H shown in FIG. 12 can also be made in accordance with the teachings of the international applications WO2007/125524 and/or WO2011/016000. In other words, the hinge device H shown in FIG. 12 may be configured to house both the pivot member V and a piston assembly directly made into the seat S and non removable therefrom, according to the teachings of one of the above mentioned applications, or both.

In a further embodiment, shown in FIG. 14, the piston device 1 and the relative pivot member V which includes the cam element C may be directly inserted in the tubular frame 310. In other words, a closing element D may be provided, such as a swing gate or door of a cold room, which is not designed to hold the hinge device H as in FIG. 13 and that includes a tubular frame 310 suitably configured to house directly the piston device 1 and the relative pivot member V. To this end, the tubular frame 310 may provide suitable seats.

Also in this case, it is understood that the embodiment of closure element D shown in FIG. 14 can be made in accordance with the teachings of the international applications WO2007/125524 and/or WO2011/016000. In other words, the tubular frame 310 of the closure element D shown in FIG. 14 may be configured to accommodate both the pivot member V and a plunger assembly made directly within it and non removable therefrom, according to the teachings of one of the above mentioned applications, or both.

From the above description, it is apparent that the invention fulfils the intended objects.

In particular, the piston device 1 allows to provide a hinge device H of any outer shape, since the whole hydraulic part of the hinge device is enclosed within the tubular body 10.

Apparently, the piston device 1 is extremely low cost, simple to manufacture and reliable over time due to the limited number of constituent parts.

Thanks to the particular configuration, the hinge device H and the piston device 1 may be made separately, so that the assembly constituted by the two devices is particularly low cost and simple to manufacture with respect to the prior art hinge devices.

Moreover, in case of need for maintenance or replacement, it is sufficient to disassemble the plate P and remove the piston device 1 from the seat S. Where possible, these operations can also be carried out without dismounting the closure element D from the support W, which greatly simplifies the maintenance of the hinge device H.

The invention is susceptible to many changes and variants. All particulars may be replaced by other technically equivalent elements, and the materials may be different according to the needs, without exceeding the scope of the invention defined by the appended claims.

The invention claimed is:

1. An assembly for controlled rotatable movement of a closing element anchored to a stationary support structure comprising:
   a piston device; and
   a hinge device;
   wherein the hinge device includes:
   a fixed element anchorable to the stationary support structure; and
   a movable element anchorable to the closing element;
   wherein said movable element and said fixed element are reciprocally coupled to allow the rotation of the movable element between an open position and a closed position, one of said movable element or said fixed element including a hinge body having at least one seat for removably inserting the piston device, the other one of said movable element or said fixed element including a pivot member having a cam element with at least one substantially flat operative surface faced to said at least one seat to interact with the piston device; and wherein the piston device includes:

a tubular body removably insertable into the at least one seat of the hinge device having a front portion configured to be faced towards the at least one substantially flat operative surface of the hinge device and a rear portion including a bottom wall, said tubular body including an operating chamber defining a first longitudinal axis;

an actuating head external to said tubular body including a substantially flat front pushing face configured to contact and engage the at least one substantially flat operative surface of the hinge device; and a plunger member slidably movable in said operating chamber between a retracted end position and an extended end position for separating therein at least one first and one second variable volume compartments fluidically communicating with each other;

wherein said actuating head is unitarily connected with said plunger member to move along said first axis between a position proximal to the front portion of the tubular body, corresponding to the retracted end position of the plunger member, and a position distal thereto, corresponding to the extended end position of the plunger member;

wherein said operating chamber further includes elastic contrast member acting on said plunger member for a returning thereof from the retracted end position to the extended end position, said operating chamber further including a working fluid acting on said plunger member to hydraulically counteract an action thereof, said elastic contrast member being configured to move between a position of maximum and minimum elongation respectively corresponding to the distal and proximal positions of said actuating head, wherein the at least one seat of the hinge body has an elongated shape to define a second longitudinal axis substantially coinciding with said first axis when the piston device is inserted within said at least one seat, the at least one seat forming an opening providing access into the hinge body in a direction substantially perpendicular to the second longitudinal axis, the pivot member of the hinge device having an elongated shape to define a third axis substantially perpendicular to said second axis;

wherein the at least one substantially flat operative surface of the pivot member is substantially parallel to said third axis, the at least one substantially flat operative surface of the pivot member and the substantially flat front pushing face of said actuating head being substantially parallel to each other when the actuating head is in the distal position and substantially perpendicular to each other when the actuating head is in the proximal position, and wherein the piston device does not include the pivot member of the hinge device, wherein the hinge body of the hinge device is configured to allow insertion or removal of the piston device in or from the at least one seat by sliding along a plane substantially perpendicular to said third axis and substantially parallel to said second axis.

2. The assembly according to claim 1, wherein said first and second variable volume compartments are adjacent to each other.

3. The assembly according to claim 1, wherein said elastic contrast member is placed in said first compartment so that said first and second variable volume compartments have respectively maximum and minimum volume in correspondence of the distal position of said actuating head and respectively the minimum and maximum volume in correspondence of the proximal position thereof.

4. The assembly according to claim 1, wherein said plunger member is inserted into said the-operating chamber so as to define therewith an interspace for passage of the working fluid between said first and second variable volume compartments.

5. The assembly according to claim 4, wherein said first and second compartments are fluidically coupled to each other only through said interspace.

6. The assembly according to the claim 4, wherein said plunger member includes a one-way valve for controlling the passage of the working fluid between said first and second variable volume compartments upon moving said actuating head from one of said proximal or distal positions towards the other one of said proximal or distal positions, said interspace allowing the passage of the working fluid between said first and second variable volume compartments upon moving back said actuating head from the other one of said proximal or distal positions towards the one of said proximal or distal positions.

7. The assembly according to claim 6, wherein said one-way valve is configured to open upon the moving of said actuating head from the distal position towards the proximal position, thus allowing the passage of the working fluid from the first variable volume compartment to the second variable volume compartment, and to close upon the moving of said actuating head from the proximal position towards the distal position, so as to force the passage of working fluid from the second variable volume compartment to the first variable volume compartment through said interspace.

8. The assembly according to the claim 6, wherein said one-way valve is configured to open upon the moving of said actuating head from the proximal position towards the distal position, thus allowing the passage of the working fluid from the second variable volume compartment to the first variable volume compartment, and to close upon the moving of said actuating head from the distal position towards the proximal position, so as to force the passage of working fluid from the first variable volume compartment to the second variable volume compartment through said interspace.

9. The assembly according to claim 8, wherein the distal position of said actuating head corresponds to the closed position of the movable element of the hinge device, the proximal position of said actuating head corresponding to the open position of the movable element of the hinge device.

10. The assembly according to claim 8, wherein the distal position of said actuating head corresponds to the open position of the movable element of the hinge device, the proximal position of said actuating head corresponding to the closed position of the movable element of the hinge device.

11. The assembly according to claim 1, wherein the at least one operative surface of the pivot member and the front pushing face of said actuating head are mutually mechanically disconnected.

12. The assembly according to claim 6, further including a rod telescopically coupled with the front portion of said tubular body and having a first end within said operating chamber unitarily coupled with said plunger member, and a second end external to said operating chamber including said actuating head.

13. The assembly according to claim 12, wherein said actuating head includes a biasing element removably couplable with the second end of said rod, said biasing element including said front pushing face.

14. The assembly according to claim 12, wherein said plunger member includes a tubular element with a rear portion coupled with said elastic contrast member and a front portion coupled with said first end of said rod.

15. The assembly according to claim 14, wherein said front portion of said plunger member is coupled with the first end of said rod to define a housing for said one-way valve which is fluidically coupled with both said at first and second variable volume compartments.

16. The assembly according to claim 15, wherein said first end of said rod includes a blind hole defining the housing of said one-way valve.

17. The assembly according to the claim 15, wherein said rear portion of said plunger member includes a first pass-through hole to put into fluidical communication said first compartment and the housing of said one-way valve, said first end of said rod including a second pass-through hole to put into fluidical communication said second compartment and the housing of said one-way valve.

18. The assembly according to claim 15, wherein said one-way valve includes a disk-shaped element sliding in said housing along said first axis.

19. The assembly according to claim 18, wherein said one-way valve further includes a contrast spring placed in said housing for forcing said disk-shaped element against an inlet or an outlet of said one-way valve.

* * * * *